United States Patent
Okamoto et al.

(10) Patent No.: US 11,939,004 B2
(45) Date of Patent: Mar. 26, 2024

(54) STEERING DEVICE

(71) Applicant: HITACHI ASTEMO, LTD., Hitachinaka (JP)

(72) Inventors: Hirokazu Okamoto, Hitachinaka (JP); Yoshiaki Kido, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 371 days.

(21) Appl. No.: 17/312,527

(22) PCT Filed: Dec. 6, 2019

(86) PCT No.: PCT/JP2019/047725
§ 371 (c)(1),
(2) Date: Jun. 10, 2021

(87) PCT Pub. No.: WO2020/121948
PCT Pub. Date: Jun. 18, 2020

(65) Prior Publication Data
US 2022/0055681 A1  Feb. 24, 2022

(30) Foreign Application Priority Data
Dec. 11, 2018 (JP) .................... 2018-231237

(51) Int. Cl.
*B62D 3/12* (2006.01)
*F16H 19/04* (2006.01)
*F16H 55/28* (2006.01)

(52) U.S. Cl.
CPC .............. *B62D 3/12* (2013.01); *F16H 19/04* (2013.01); *F16H 55/28* (2013.01)

(58) Field of Classification Search
CPC ........ B62D 3/12; B62D 3/123; B62D 5/0421; F16H 19/04; F16H 55/28; F16H 2055/281
See application file for complete search history.

(56) References Cited

U.S. PATENT DOCUMENTS 3,777,589 A * 12/1973 Adams .................. B62D 3/123
74/498
2002/0085778 A1 * 7/2002 Mena .................... F16C 33/20
384/276

(Continued)

FOREIGN PATENT DOCUMENTS

JP   2007-290502 A   11/2007
JP   2012-183845 A    9/2012

(Continued)

OTHER PUBLICATIONS

Kiyoto Takei, Rack-And-Pinion Steering Gear, EPO, JP 2012-183845 A, Machine Translation of Description (Year: 2012).*

(Continued)

*Primary Examiner* — James A English
(74) *Attorney, Agent, or Firm* — FOLEY & LARDNER LLP

(57) ABSTRACT

A steering device includes: a housing; and a spring configured to urge the retainer toward the rack bar in the second axis direction, and the rack bar, the retainer, the spring, and the spring holding member being disposed in this order in the second axis direction; the retainer chamfering portion provided on the retainer second end portion near the spring holding member, on a retainer second end portion outer circumference portion, and the retainer chamfering portion formed at a portion which is nearest the spring holding member abutment surface in the retainer second end portion outer circumference portion in a section that passes through the second axis, and that is perpendicular to the first axis, when the retainer main body portion is inclined with respect to the second axis.

9 Claims, 13 Drawing Sheets

(56) References Cited

U.S. PATENT DOCUMENTS

| | | | |
|---|---|---|---|
| 2002/0124670 A1* | 9/2002 | Bugosh | F16H 55/283 74/498 |
| 2009/0174164 A1 | 7/2009 | Kaida et al. | |
| 2014/0013901 A1* | 1/2014 | Urbach | B62D 3/123 74/606 R |
| 2018/0043924 A1 | 2/2018 | Okamoto et al. | |

FOREIGN PATENT DOCUMENTS

| | | |
|---|---|---|
| JP | 2016-182889 A | 10/2016 |
| JP | 2019-093891 A | 6/2019 |

OTHER PUBLICATIONS

International Search Report dated Feb. 10, 2020 issued in International Application No. PCT/JP2019/047725, with English translation, 6 pages.

Written Opinion of the International Searching Authority dated Feb. 10, 2020 issued in International Application No. PCT/JP2019/047725, with English translation, 21 pages.

* cited by examiner

STEERING DEVICE

TECHNICAL FIELD

This invention relates to a steering device.

BACKGROUND ART

There has been known a conventional steering device described, for example, in a following patent document.

In this steering device, a retainer supports a back surface of a rack bar engaged with a pinion shaft so as to suppress a direct sliding movement of the rack bar with respect to a housing receiving the rack bar. The retainer is configured to be urged toward the back surface side of the rack bar in a direction of a second axis perpendicular to a first axis corresponding to a longitudinal direction of the rack bar, by a spring received between the retainer and a spring holding member disposed on a side opposite to the rack bar to confront the retainer, and to elastically support the rack bar.

PRIOR ART DOCUMENT

Patent Document

Japanese Patent Application Publication No. 2016-182889

SUMMARY OF THE INVENTION

Problems which the Invention is Intended to Solve

However, in the conventional steering device, a base end portion outer circumference edge of the retainer confronting the spring holding member is an angular portion. With this, the retainer is pushed toward the spring holding member side based on the input from the pinion shaft side in a state where the retainer is inclined in one direction of the sliding movement direction of the rack bar. The angular portion of the retainer is caught by the spring holding member. With this, the smooth movement of the rack bar may be interfered.

It is, therefore, an objection of the present invention to provide a steering device devised to solve the above-described problems, to suppress the catching between the retainer and the spring holding member, and to ensure the smooth movement of the rack bar.

Means for Solving the Problem

In one aspect of the present invention, the retainer includes retainer first and second end portions which are axial end portions of the retainer. A retainer chamfering portion is provided at a portion which is nearest a spring holding member in an outer circumference portion of the retainer second end portion.

Benefit of the Invention

By the present invention, it is possible to ensure the smooth movement of the rack bar.

BRIEF DESCRIPTION OF DRAWINGS

FIG. 5 show the retainer according to the first embodiment of the present invention.

FIG. 7 are views showing a posture variation of the retainer in the first embodiment of the present invention. FIG. 7 are enlarged views showing a main portion of the steering device.

FIG. 8 show a retainer chamfering (beveling) portion according to a first variation of the first embodiment of the present invention. FIG. 8 show enlarged views showing an outer circumference portion of a retainer second end portion.

FIG. 9 show a retainer chamfering (beveling) portion according to a second variation of the first embodiment of the present invention.

FIG. 12 are views showing a posture variation of the retainer in the second embodiment of the present invention. FIG. 12 are enlarged views showing a main portion the steering device.

FIG. 13(b) shows a case where a center of the radius of the curvature of the spring holding member chamfering portion is provided near the retainer. FIG. 13(c) shows a case where the center of the radius of the curvature of the spring holding member chamfering portion is provided near a fixing member.

DESCRIPTION OF EMBODIMENTS

Hereinafter, a steering device according to an embodiment of the present invention is explained in detail with reference to the drawings. Besides, in the below-described embodiment, this steering device is applied to a steering device of a vehicle, like the conventional device.

(Configuration of Steering Device)

Figure 1:
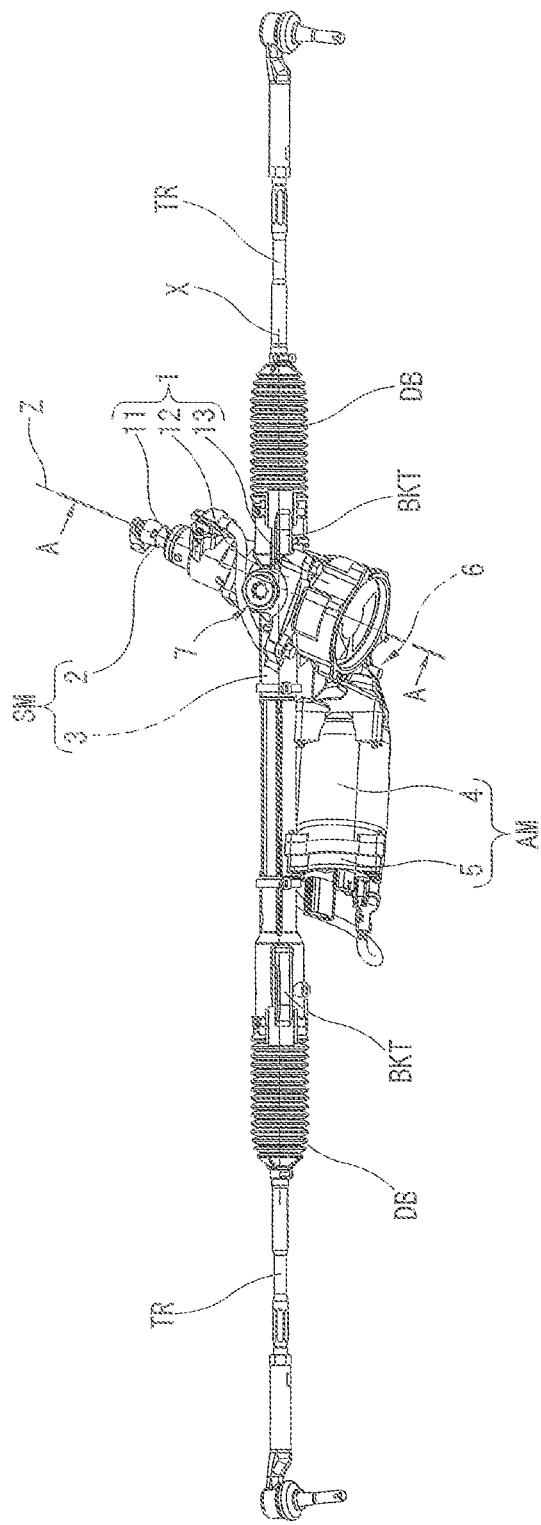
FIG. 1 is an external perspective view showing a steering device according to the present invention.
Figure 2:
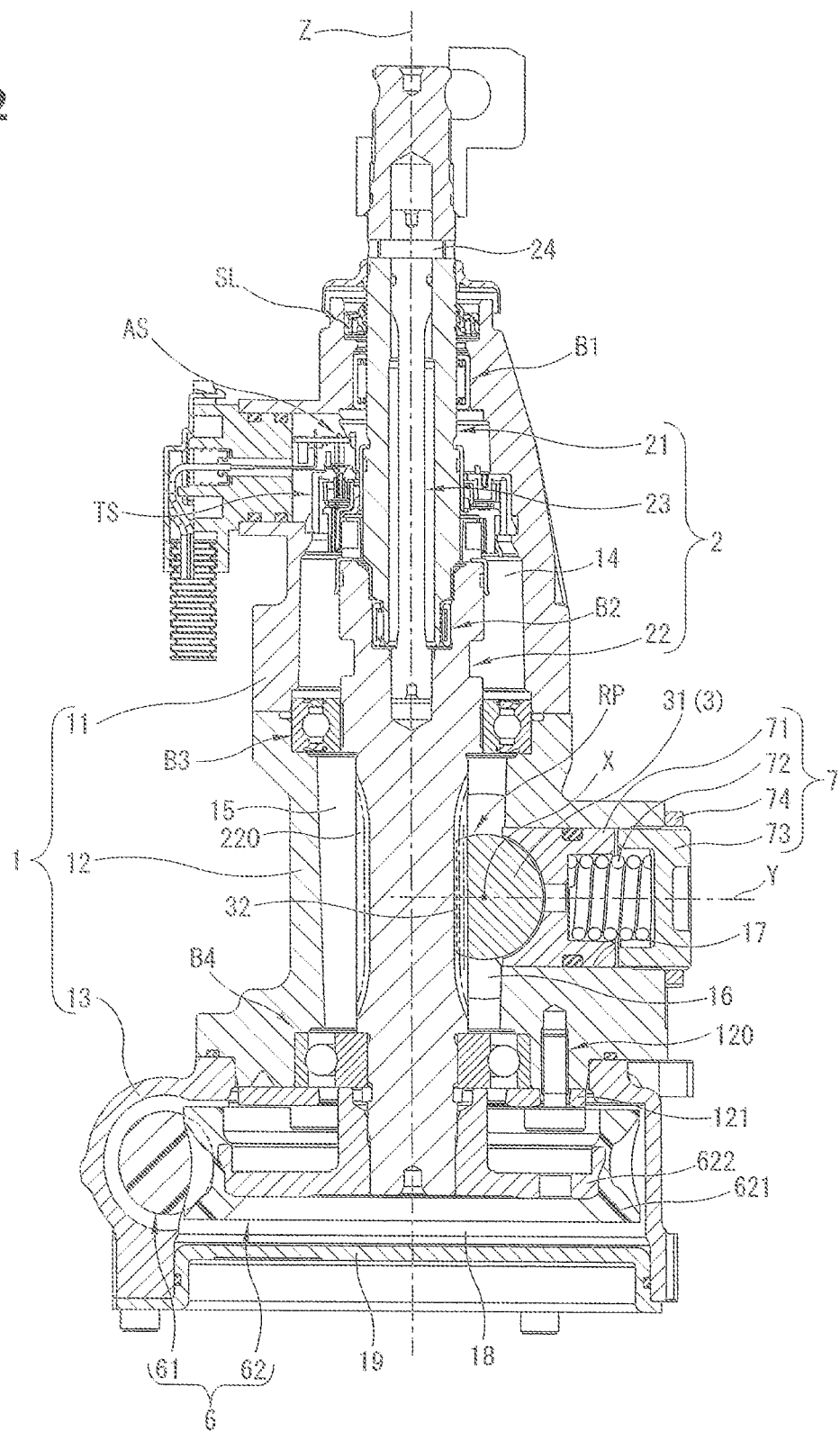
FIG. 2 is a sectional view taken along an A-A line of FIG. 1.

FIG. 1 is a perspective view showing an external appearance of a steering device according to this embodiment. FIG. 2 is a sectional view which shows the steering device, and which is taken along an A-A line of FIG. 1. In the explanation in the drawings, an "axial direction" is a direction parallel to a rotation axis Z of a steering shaft 2. A "radial direction" is a direction perpendicular to the rotation axis Z of the steering shaft 2. A "circumferential direction" is a direction around the rotation axis Z of the steering shaft 2. Moreover, an upper side of the drawing on which a steering wheel is linked is a "first end side" in the axial direction. A lower side of the drawing is a "second end side" in the axial direction.

As shown in FIG. 1, the steering device includes a steering mechanism SM for the steering based on operation of a driver; and a steering assist mechanism AM configured to assist the steering operation of the driver. Moreover, this steering device is suspended on a vehicle body of a vehicle (not shown) through a bracket BKT provided to a housing 1 receiving the steering mechanism SM.

As shown in FIG. 2, the steering mechanism SM includes the steering shaft 2 linked to a steering wheel (not shown); and a rack bar 3 which is linked to steered wheels (not shown). The steering shaft 2 and the rack bar 3 are linked through a conversion mechanism RP. The conversion mechanism RP is a rack and pinion mechanism including pinion teeth portion 220 formed on the steering shaft 2 (an output shaft 22 described later), and a rack teeth portion 32 formed on the rack bar 3.

The housing 1 is made from the metal material such as the aluminum alloy material. The housing 1 has a three divided structure including a first housing 11, a second housing 12, and a third housing 13. That is, the housing 1 includes the first housing 1 receiving the first side of the steering shaft 2 (an input shaft 21 described later); the second housing 12 which is mounted to the second side of the first housing 11, and which receives the second side of the steering shaft 2 (an output shaft 22 described later); and a third housing 13 which is mounted to the second side of the second housing 12, and which receives the second end portion of the steering shaft 2, and a speed reduction mechanism 6 (described later) linked to the second end side of the steering shaft 2. The first housing 11, the second housing 12, and the third housing 13 are tightened by a plurality of bolts (not shown).

The first housing 11 has a cylindrical shape including both end openings in the axial directions. The first housing 11 includes a steering shaft receiving portion 14 which is formed within the first housing 11, which receives the steering shaft 2, and through which the steering shaft 2 penetrates. The steering shaft receiving portion 14 receives a first bearing B1 and a seal member SL on the first side (the input shaft 21 described later) in the axial direction of the steering shaft 2. The first bearing B1 rotatably supports the first end side of the steering shaft 2. The seal member SL liquid-tightly seals the first end opening of the steering shaft receiving portion 14. Moreover, the steering shaft receiving portion 14 receives a sensor unit SU formed by integrating a steering angle sensor AS and a torque sensor TS. The signal sensed by this sensor unit SU is transmitted to the steering assist mechanism AM (a control device 5 described later) through a wire harness WH pulled out from a side portion of the first housing 11 to the outside.

The second housing 12 has a pinion receiving portion 15, a rack bar receiving portion 16, and a retainer receiving portion 17 which are formed within the second housing 12. The pinion receiving portion 15 receives the second end side of the steering shaft 2 (the output shaft 22 described later) in the penetrating state. The rack bar receiving portion 16 is connectable to the pinion receiving portion 15. The retainer receiving portion 17 is connectable to the rack bar receiving portion 16. That is, in the second housing 12, the pinion receiving portion 15 is provided along the rotation axis Z of the steering shaft 2. The rack bar receiving portion 16 is provided along an X axis direction which is a first axis direction perpendicular to the rotation axis Z of the steering shaft 2. The retainer receiving portion 17 is provided along a Y axis direction which is a second axis direction perpendicular to the X and Z axes.

The pinion receiving portion 15 includes both end openings in the axial direction. The opening on the first end side is connected to the steering shaft receiving portion 14 of the first housing 11. The opening on the second end side is connected to a speed reduction mechanism receiving portion 18 described later. That is, the first end side of the output shaft 22 extends through the first end side opening portion of the second housing 12 to the steering shaft receiving portion 14 of the first housing 11. The first end side of the output shaft 22 is connected through the torsion bar 23 to the input shaft 22 within the steering shaft receiving portion 14. On the other hand, the second end side of the output shaft 22 extends to the speed reduction mechanism receiving portion 18 described later. The second end side of the output shaft 22 is connected to a worm wheel 62 within the speed reduction mechanism receiving portion 18.

Moreover, the pinion receiving portion 15 receives and holds a third bearing B3 in the axial opening portion on the first end side, and a fourth bearing B4 in the axial opening portion on the second end side. The third bearing B3 rotatably supports the first end side of the output shaft 22. The fourth bearing B4 rotatably supports the other end side of the output shaft 22. In this case, an outer race of the second bearing B2 is sandwiched by the first housing 11 and the second housing 12 so that the second bearing B2 is mounted and fixed in the first end side opening portion of the second housing 12. On the other hand, an outer race of the fourth bearing B4 is held by a fixing member 121 which has a circular plate shape, and which is tightened to the second end portion of the second housing 12 by a plurality of bolts 120 so that the fourth bearing B4 is mounted and fixed in the second end side opening of the second housing 12.

The rack bar receiving portion 16 is a substantially cylindrical space extending in a longitudinal direction of the rack bar 3. The rack bar receiving portion 16 is disposed between the pinion receiving portion 15 and the retainer receiving portion 17. The rack bar receiving portion 16 receives the rack bar 3 so that the rack bar 3 is configured to be moved in the X axis direction which is the first axis. Besides, in this embodiment, the X axis corresponding to the first axis is an axis which passes through a center of the rack bar 3 in a section perpendicular to the longitudinal direction of the rack bar 3, and which is parallel to the longitudinal direction of the rack bar 3.

The retainer receiving portion 17 is a substantially cylindrical space extending in the Y axis direction which is the second axis. An inner end portion of the retainer receiving portion 17 in the Y axis direction is opened to the rack bar receiving portion 16. An outer end portion of the retainer receiving portion 17 in the Y axis direction is opened to the outside. The retainer receiving portion 17 receives an adjustment mechanism 7 configured to support the rack bar 3 to adjust the engagement between the pinion teeth portion 220 and the rack teeth 30. This adjustment mechanism 7 includes a retainer 71 supporting a back surface portion 33 provided on a side opposite to the rack teeth portion 32 in the circumferential direction; a spring 72 configured to urge the retainer 71 toward the rack bar 3 side; and a spring holding member 73 configured to adjust the urging force of the spring 72. The retainer 71, the spring 72, and the spring 73 are received to be moved in the Y axis direction. Besides, in this embodiment, the Y axis corresponding to the second axis is an axis which is perpendicular to the X axis, and which passes through a center of the retainer receiving portion 17.

The third housing 13 includes the speed reduction mechanism receiving portion 18 which is formed within the third housing 13, and which receives the speed reduction mechanism 6. The speed reduction mechanism receiving portion 18 includes a wheel receiving portion 181 receiving the worm wheel 62; and a shaft receiving portion 182 which is provided on the radially outside the wheel receiving portion 181, which is connected to the wheel receiving portion 181, and which receives a worm shaft 61. The wheel receiving portion 181 is provided on the second side of the pinion receiving portion 15 in the axial direction. The wheel receiving portion 181 has a stepped diameter increasing shape. The wheel receiving portion 181 receives the worm wheel 62 mounted to the second end portion of the output shaft 22 extending from the pinion receiving portion 15 side to the wheel receiving portion 181. The grease (not shown) for the lubricant for the speed reduction mechanism 6 (the worm gear) is filed in this wheel receiving portion 181. The second end side opening of the wheel receiving portion 181 is closed by a closing member 19 having a substantially cover shape.

The steering shaft 2 includes the input shaft 21 configured to rotate as a unit with the steering wheel (not shown); and the output shaft 22 linked to the rack bar 3. The input shaft 11 and the output shaft 12 are connected by a torsion bar 23 having a rod shape to be rotated relative to each other. In particular, the torsion bar 23 is received radially inside the input shaft 21 having the cylindrical shape. The first end portion of the input shaft 21 and the first end portion of the torsion bar 23 are connected through a connection pin 24. On the other hand, the first end portion of the output shaft 22 and the second end portion of the torsion bar 23 are connected by a connection pin (not shown).

The first end side of the input shaft 21 in the axial direction is connected to the steering wheel (not shown). The second end side of the input shaft 21 in the axial direction is connected to the torsion bar 23. The first end side of the input shaft 21 is rotatably supported by the first bearing B1 received and held within the first housing 11. The second end side of the input shaft 21 is rotatably supported by the second bearing B2 received and held within the output shaft 22.

The first end side of the output shaft 22 in the axial direction is connected to the torsion bar 23. The second end side of the output shaft 22 in the axial direction is linked to the rack bar 3. That is, the output shaft 22 includes the pinon teeth portion 220 formed on the outer circumference of the second end side of the output shaft 22. This pinion teeth portion 220 is engaged with the rack teeth portion 32 of the rack bar 3 so that the rotation of th6 output shaft 22 is converted to the axial movement of the rack bar 3, and transmitted to the rack bar 3. The first end side of the output shaft 22 is rotatably supported by the third bearing B3 received and held in the first end side opening portion of the second housing 12. The second end side of the output shaft 22 is rotatably supported by the fourth bearing B4 received and held in the second end side opening portion of the second housing 12.

Moreover, the torque sensor TS is disposed on the outer circumference side of the steering shaft 2. The torque sensor TS is configured to sense the steering torque inputted to the steering shaft 2 by the steering operation of the driver. This torque sensor TS is configured to sense the steering torque based on a displacement amount of the relative rotation between the input shaft 21 and the output shaft 22. The steering assist mechanism AM is configured to be controlled and driven based on the steering torque sensed by this torque sensor TS, and to provide the steering assist force according to the steering torque.

As shown in FIGS. 1 and 2, the rack bar 3 has a substantially rod shape. The rack bar 3 includes a rack bar main body portion 31; the rack bar teeth portion 32 formed on the rack bar main body portion 31, and configured to be engaged with the pinon teeth portion 220 of the output shaft 22; and the rack back surface portion 33 which has an arc section, which is formed on the rack bar main body portion 31, and which is provided on a side opposite to the rack teeth portion 32 with respect to the X axis (the Z axis). As shown in FIG. 1, the rack bar 3 includes both axial end portions linked through tie rods TR and knuckle arms (not shown) to the steered wheels (not shown). That is, the rack bar 3 is configured to be moved in the axial direction, and thereby to push and pull the knuckle arms (not shown) through the tie rods TR to vary the direction of the steered wheels (not shown). Boot members DB made from the rubber are mounted between the rack bar 3 and the tie rods TR. The boot members DB cover joints (not shown) connecting the rack bar 3 and the tie rods TR. These boot members DB are configured to protect the joints from the water and the dust. Each of the boot members DB has a cylindrical bellows shape which is extendable in accordance with the axial movement of the rack bar 3. Each of the boot members DB includes a first end side fixed to the rack housing 1, and a second end side fixed to the tie rod TR. Each of the boot members DB surrounds one of the joints.

As shown in FIG. 1, the steering assist mechanism AM includes an electric motor 4 configured to produce the steering assist force; a control device configured to control and drive the electric motor 4; and the speed reduction mechanism 6 configured to reduce the speed of the rotation of the electric motor 4, and to transmit the speed-reduced rotation to the rack bar 3. That is, the steering assist mechanism AM is configured to assist the axial movement of the rack bar 3 by the rotation force of the electric motor 4 configured to be controlled and driven based on detection results of various sensors such as a vehicle speed sensor (not shown) and the torque sensor TS which are inputted to the control device 5.

The speed reduction mechanism 6 includes the worm shaft 61 which is a known worm gear, and which is provided on an output shaft (not shown) of the electric motor 4; and the worm wheel 62 which is formed an the outer circumference of the second end portion of the output shaft 22 to rotate as a unit with the output shaft 22. The worm shaft 61 is integrally made, for example, from the resin material. The worm shaft 61 is rotatably received within the shaft receiving portion 182 with the output shaft (not shown) of the electric motor 4. On the other hand, the worm wheel 62 includes a wheel teeth portion 621 made from the resin material; and an insert member 622 made from the metal material. The worm wheel 62 is formed by integrally molding the wheel teeth portion 621 and the insert member 622. The worm wheel 62 is press-fit on the outer circumference of the second end portion of the output shaft 22 through the insert member 622. The worm wheel 62 is rotatably received within the wheel receiving portion 181 with the second end portion of the output shaft 22.

Figure 3:
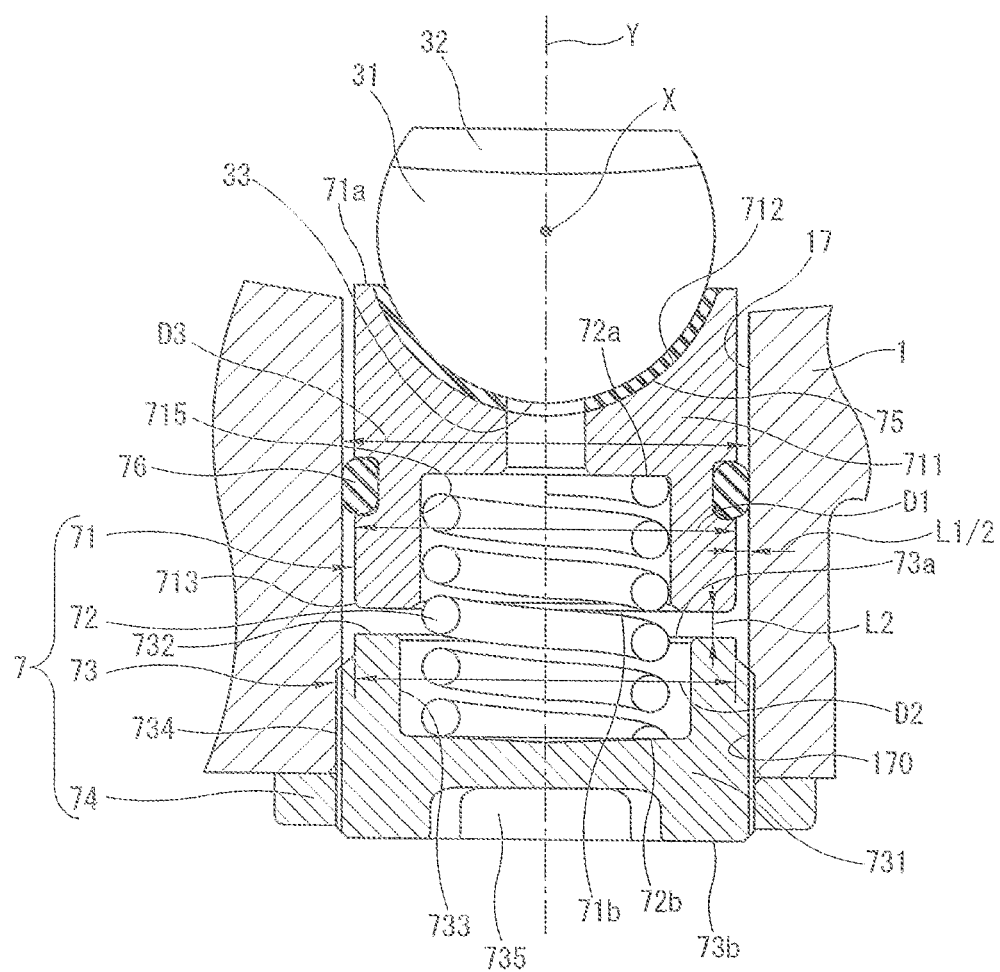
FIG. 3 is an enlarged view showing a main portion in FIG. 2.
Figures 4A, 4B:
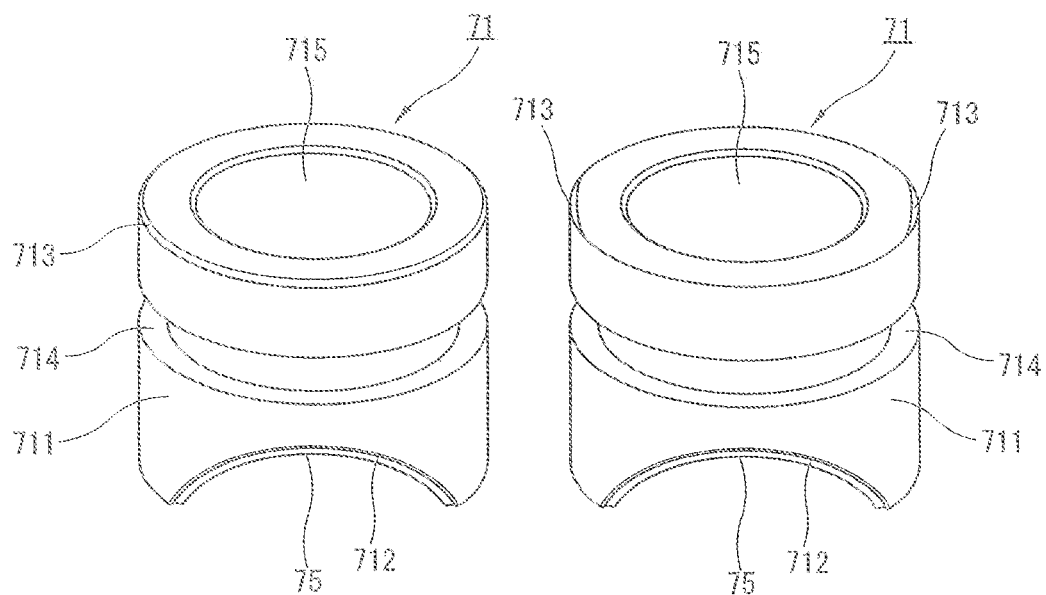
FIG. 4(a) is a perspective view showing a retainer according to a first embodiment of the present invention.
FIG. 4(b) is a perspective view according to a variation of FIG. 4(a).
Figure 5A:
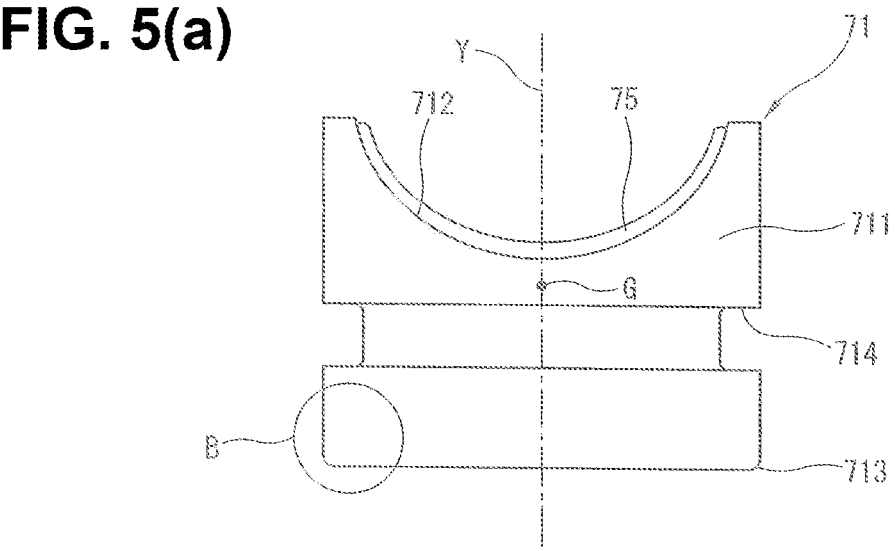
FIG. 5(a) is a side view showing the retainer shown in FIG. 2.
Figure 5B:
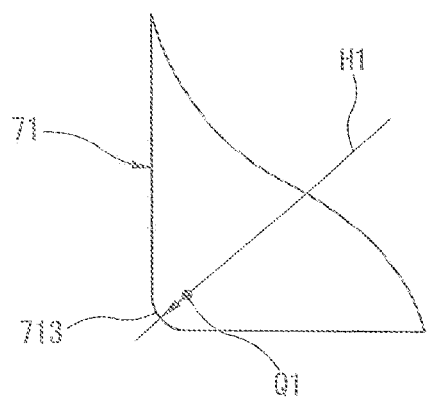
FIG. 5(b) is an enlarged view showing a B portion in FIG. 5(a).

FIG. 3 is an enlarged view showing a portion near the adjustment mechanism 7 shown in FIG. 2, and showing a main portion of the adjustment mechanism 7. Besides, FIG. 3 shows the adjustment mechanism 7 in a static state. Moreover, FIG. 4(a) is a perspective view showing the retainer in this embodiment. FIG. 4(b) is a perspective view showing the retainer in a variation of this embodiment. Furthermore, FIG. 5(a) is a side view showing the retainer shown in FIG. 2. FIG. 5(b) is an enlarged view showing a B portion of FIG. 5(a).

As shown in FIG. 3, the adjustment mechanism 7 includes the retainer 71 supporting the rack back surface portion 33 of the rack bar 3; the spring 72 configured to urge the retainer 71 toward the rack bar 3 side; the spring holding member 73 which receives and holds the spring 72, and which is configured to adjust the urging force of the spring 72. That is, the adjustment mechanism 7 is configured to urge the retainer 71 toward the rack back surface portion 33 based on the urging force of the spring 72 held by the spring holding member 73 so that the retainer 71 is slidably abutted on the rack back surface portion 33. In this way, the adjustment mechanism 7 is configured to support the rack bar 3 while pressing the rack bar 3 toward the output shaft 22 side by the predetermined urging force, and thereby to adjust the engagement between the pinion teeth portion 220 and the rack teeth portion 32.

As shown in FIG. 3, FIG. 4(a), and FIG. 5(a), the retainer 71 includes a retainer main body portion 711 which is a main body of the retainer 71, which has a substantially cylindrical shape, and which is made from the metal material such as the aluminum alloy. In particular, the retainer main body portion 711 includes a pair of end portions of the retainer main body portion 711 in the Y axis direction. The pair of the end portions of the retainer main body portion 711 includes a retainer first end portion 71a confronting the rack bar 3a. The retainer main body portion 711 includes a retainer abutment portion 712 which is formed on the retainer first end portion 71a, which has a recessed arc surface, which extends in the X axis direction, and which is configured to abutted on the rack back surface portion 33. This retainer abutment portion 712 is constituted by the recessed arc surface having a curvature corresponding to a curvature of the rack back surface portion 33. A sliding member 75 is mounted on this arc surface of the retainer abutment portion 712. The sliding member 75 is made from material (for example, PTFE (polytetrafluoroethylene)) having a small frictional resistance smaller than that of the retainer main body portion 711.

On the other hand, the pair of the end portions of the retainer main body portion 711 in the Y axis direction includes a retainer second end portion 71b which is near the spring holding member 73 on a side opposite to the rack bar 3. The retainer main body portion 711 includes a retainer chamfering portion 713 which is formed on an entire circumference of a retainer second end portion outer circumference portion which is an outer circumference edge of the retainer second end portion 71b in the circumferential direction. In particular, as shown in FIG. 5(b), the retainer chamfering portion 713 is constituted by a round chamfering portion having an arc section. Besides, in this embodiment, this retainer chamfering portion 713 is the round chamfering portion having a center Q of the curvature on a bisector H1 of a corner of the retainer second end portion 71b. The chamfering equally extend on the retainer first end portion 71a side and on the retainer second end portion 71b side.

In this case, the "chamfering" is described in JIS0701-1987. The "chamfering" represents the chamfering of the corner and the edge by the cutting, and the roundness of the corner and the edge. This "chamfering" includes the chamfering described by "C", and the roundness R described by "R". Accordingly, the "retainer chamfering portion" according to the present invention includes, for example, the chamfering described in FIG. 9, and exemplified in a second variation described later, in addition to the round chamfering described in FIG. 5, and exemplified in this embodiment. Furthermore, in the above-described definition of the "chamfering", the "chamfering" is defined by forming by the cutting. However, the "retainer chamfering portion" is sufficient to suppress the catching with the spring holding member 73 as described later. Accordingly, the "retainer chamfering portion" according to the present invention includes the portion formed by methods other than the cutting, such as the shear drop according to the die molding such as the forging, in addition to the portion formed by the cutting.

Moreover, the "retainer chamfering portion" according to the present invention is not limited to the portion formed on the overall circumference of the retainer second end portion outer circumference portion as shown in FIG. 4(a), as exemplified in this embodiment. That is, for example, the "retainer chamfering portion" may be partially formed on a pair of portions of the retainer second end portion outer circumference portion which are abutted on the spring holding members 73 by the inclination of the retainer 71 as shown in FIG. 4(b), that is, on two portions crossing a section which passes through the Y axis that is the second axis, and which is parallel to the X axis that is the first axis.

As shown in FIG. 3, FIG. 4(a), and FIG. 5(a), the retainer main body portion 711 includes a retainer holding member holding groove 714 which is formed on the outer circumference side of the retainer main body portion 711 at a position farther from the rack bar 3 than a middle point G of the retainer 71 in the Y axis direction which is the second axis. This retainer holding member holding groove 714 is an annular groove extending in the circumferential direction of the Y axis which is the second axis. A retainer holding member 76 is mounted in this retainer holding member holding groove 714. The retainer holding member 76 is configured to hold the retainer 71 within the retainer holding portion 17. The retainer holding member 76 is a known O ring. The retainer holding member 76 is configured to be elastically abutted on the inner circumference surface of the retainer receiving portion 17 so that the retainer 71 can be swung around the retainer holding member 76 which is the center.

Figure 7A:
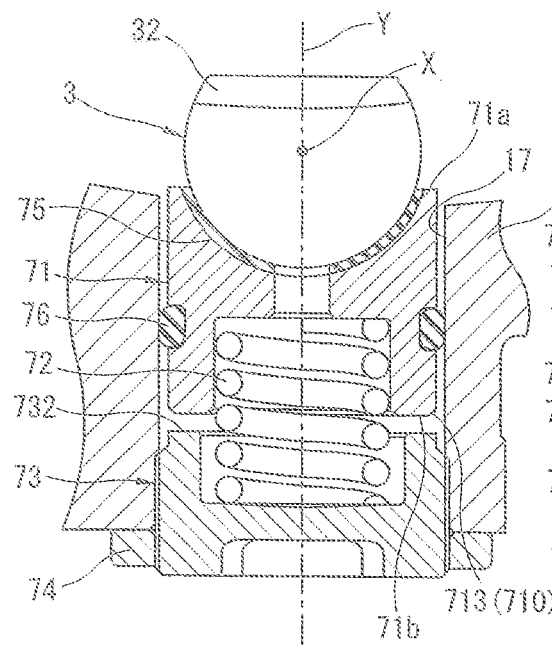
FIG. 7(a) shows a state A of FIG. 5.
Figure 7B:
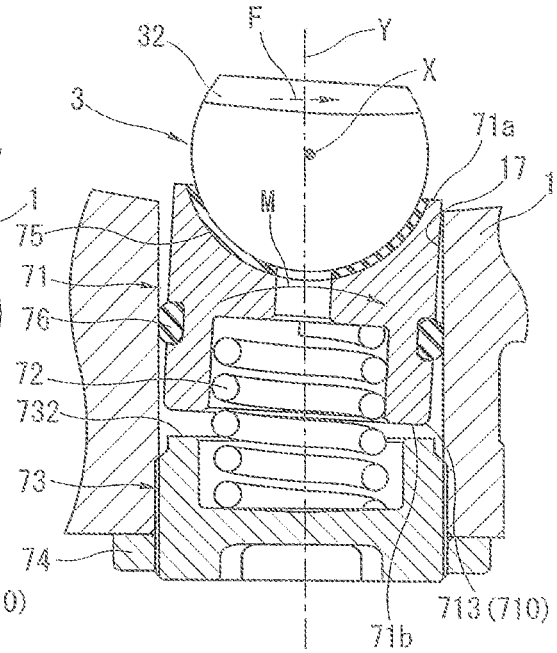
FIG. 7(b) shows a state B of FIG. 5.
Figure 7C:
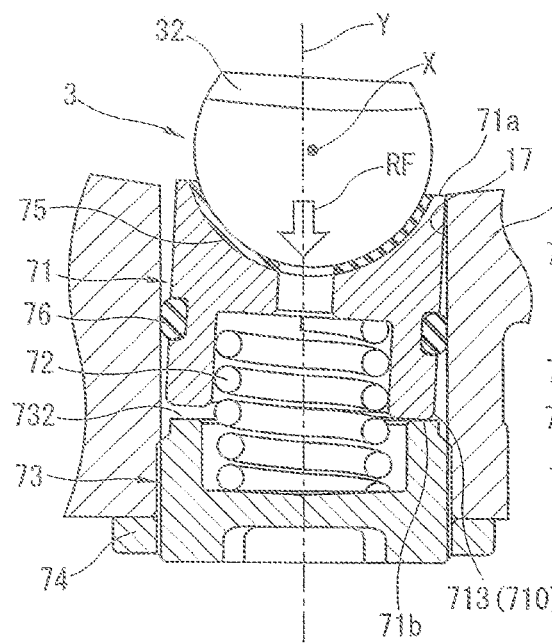
FIG. 7(c) shows a state C of FIG. 5.
Figure 7D:
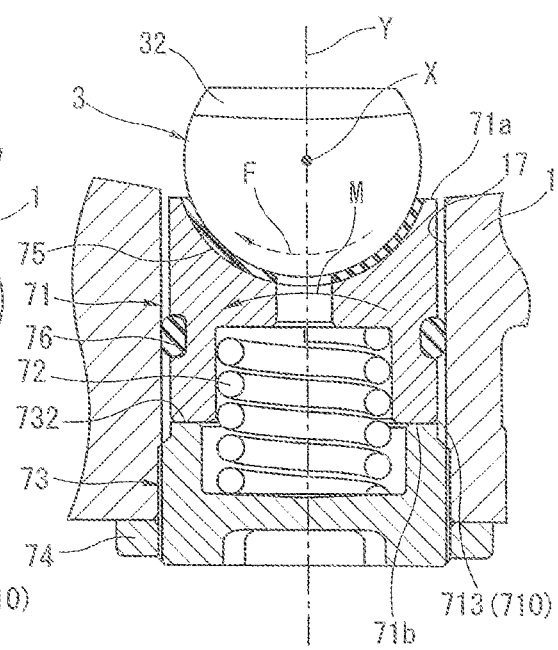
FIG. 7(d) shows a state D of FIG. 5.

Moreover, the retainer main body portion 711 has an outside diameter D1 with respect to the Y axis which is the second axis. The outside diameter D1 is set to be smaller than an outside diameter D2 of a spring holding member abutment surface 732 (described later) of the spring holding member 73 with respect to the Y axis which is the second axis. With this, as shown in FIG. 7(d) described later, it is possible to suppress the abutment between an outer circumference edge of the spring holding member first end portion 73a of the spring holding member 73 confronting the retainer 71, and the outer circumference edge of the retainer second end portion 71b.

Moreover, as shown in FIG. 3, the outside diameter D1 of the retainer main body portion 711 is smaller than an inside diameter D3 of the retainer receiving portion 17 by a first length L1. Furthermore, the retainer second end portion 71b and the spring holding member abutment surface 732 are apart from each other by a second length L2. The first length L1 and the second length L2 are set to satisfy "L1/2<L2".

That is, a difference (L1/2) between a radius of the inside diameter D3 of the retainer main body portion 711 and the outside diameter D1 of the retainer main body portion 711 is smaller than a difference between the retainer second end portion 71b and the spring holding member abutment surface 732.

Moreover, as shown in FIG. 3, the retainer main body portion 711 a spring first end portion receiving portion 715 which has a circular recessed shape, which is formed on the retainer second end portion 71b on a side opposite to the rack bar 3, which receives a first end portion of the spring 72 in the Y axis direction, and which is recessed toward the retainer first end portion 71 side. The spring first end portion receiving portion 715 has a predetermined inside diameter corresponding to the outside diameter of the spring 72. An inner circumference surface of the spring first end portion receiving portion 715 is configured to hold the outer circumference surface of the spring first end portion 72a.

The spring 72 is a known coil spring. The spring 72 includes a pair of end portions in the longitudinal direction which includes the spring first end portion 72a that is a first end portion, and the spring second end portion 72b which is a second end portion. The first end portion 72a is received within the spring first end portion receiving portion 715 of the retainer 71. The second end portion 72b is received within a spring second end portion receiving portion 733 (described alter) of the spring holding member 73. That is, this spring 72 is inserted and mounted between the retainer 71 and the spring holding member 73 within a spring receiving space S formed between the first end portion receiving portion 715 and the second end portion receiving portion 733 in a state where a predetermined precompression (preload) is provided to the spring 72. With this, the spring 72 is configured to constantly urge the retainer 71 toward the rack bar 3 side based on the predetermined precompression. That is, the back bar 3 is configured to be pressed toward the output shaft 22 side through the retainer 71 based on the urging force of the spring 72, so that the constant engagement state between the pinon teeth portion 220 and the rack teeth portion 32 is maintained.

The spring holding member 73 is formed by forging the metal material such as the aluminum alloy by using the die. The spring holding member 73 includes a spring holding member main body portion 731 having a bottomed cylindrical shape. In a case where the spring holding member main body portion 731 is formed, the spring holding member abutment surface 732 configured to be abutted on the retainer 71 is constituted by the plastic machined surface formed by the forging. The spring holding member includes the second end portion receiving portion 733 which is formed at a central position of the spring holding member first end portion 73a confronting the spring 72, and which is recessed toward the retainer second end portion 71b side. The spring second end portion receiving portion 733 has a predetermined inside diameter corresponding to the outside diameter of the spring 72, similarly to the spring first end portion receiving portion 715. With this, the inner circumference surface of the spring second end portion receiving portion 733 is configured to hold the outer circumference surface of the spring second end portion 72b.

Moreover, the spring holding member 73 includes an external screw portion 734 which is formed on an outer circumference side of the spring holding member second end portion 73b on a side opposite to the spring holding member first end portion 73a, and which is engaged with an internal screw portion 170 of the retainer receiving portion 17. That is, the spring holding member 73 is configured to be screwed from the opening end portion of the retainer receiving portion 17 in a state where the external screw portion 734 is engaged with the internal screw portion 170 of the retainer receiving portion 17, and thereby to be moved in the Y axis direction which is the second axis. The spring holding member 73 is configured to adjust the urging force (the precompression) of the spring 72 provided to the retainer 71 by the movement of the spring holding member 73 in the Y axis direction. Moreover, the spring holding member second end portion 73b includes a tool engagement portion 735 which is formed on an end surface of the spring holding member second end portion 73b, and which is configured to be engaged with a tool (not shown) such as a hexagonal wrench at the screwing of the spring holding member 73.

A fixing member 74 is a known lock nut. The fixing member 74 includes an internal screw portion 741 which is formed on an inner circumference side of the fixing member 74, and which is configured to be engaged with the external screw portion 734 of the spring holding member 73. That is, in the opening end portion of the retainer receiving portion 17, the fixing member 74 is screwed on the external screw portion 734 of the spring holding member 73 which is exposed from the retainer receiving portion 17 to the outside to be tightened on the opening end portion of the retainer receiving portion 17. With this, the fixing member 74 fixes the spring holding member 73 at an arbitrary position.

(Posture Variation of Retainer at Sliding Movement of Rack Bar)

Figure 6:
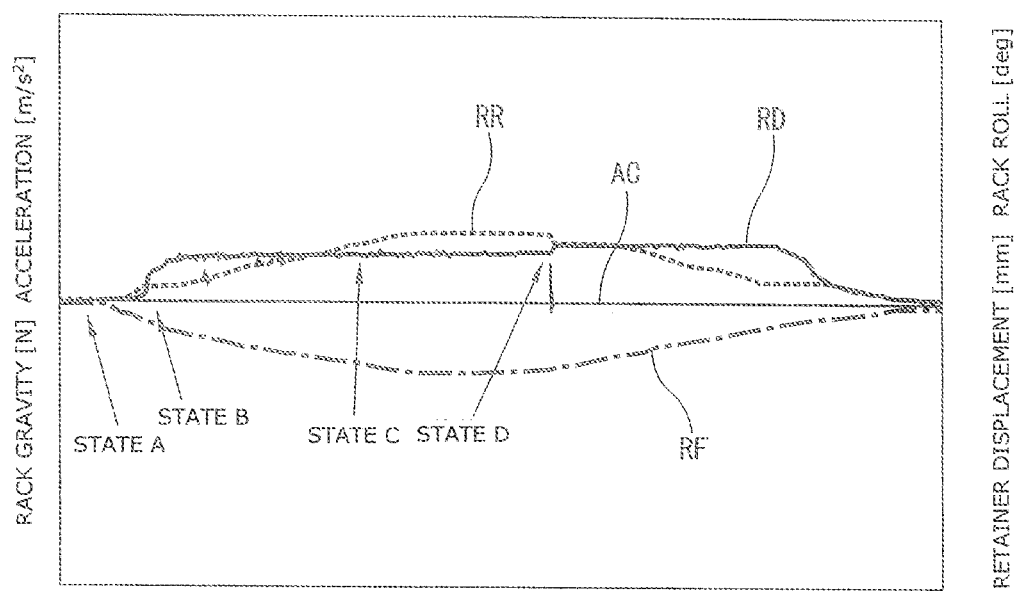
FIG. 6 is a graph showing measurement results of a retainer displacement amount and a rack bar rolling amount at a steering operation.

Hereinafter, a posture variation of the retainer 71 which is generated at the sliding movement of the rack bar 3 in this embodiment is explained based on FIG. 6 and FIG. 7. Besides, FIG. 6 is a graph showing measurement results between the displacement amount of the retainer 71 and the rolling amount of the rack bar 3, which are generated at the steering. In this case, a symbol AC shown by a thin solid line represents an acceleration. A symbol RD shown by a bold solid line represents the displacement amount of the retainer 71. A symbol RR shown by a broken line represents the rolling amount of the rack bar 3. A symbol RF shown by one dot chain line represents a thrust of the rack bar 3. FIG. 7 are views showing the posture variations of the retainer 71 in this embodiment by enlarging main portions of the steering device. FIG. 7(a) shows a state A in FIG. 5. FIG. 7(b) shows a state B in FIG. 5. FIG. 7(c) shows a state C in FIG. 5. FIG. 7(d) shows a state D in FIG. 5.

Firstly, as shown in "the state A" in FIG. 6, the rolling amount RR of the rack bar 3 and the displacement amount RD of the retainer 71 are substantially zero in the static state of the rack bar 3. That is, as shown in FIG. 7(a), the rack bar 3 is in the static state. The retainer 71 is not inclined. The retainer 71 is straightly abutted on the rack bar 3 along the Y axis direction which is the second axis.

Next, as shown in "the state B" in FIG. 6, when the rack bar 3 is started to be slidably moved, the rolling amount RR of the rack bar 3 is generated. Moreover, the retainer 71 is displaced in accordance with the rolling of the rack bar 3, so that the displacement amount RD of the retainer 71 is generated. That is, as shown in FIG. 7(b), moment M shown by a solid line arrow in FIG. 7(b) is acted to the retainer 71 due to component force F acted to the rack teeth portion 32. Consequently, the retainer 71 is inclined in the direction shown by FIG. 7(b) around the retainer holding member 76 which is the fulcrum.

Then, as shown in "the state C" in FIG. 6, when the thrust RF of the rack bar 3 is further increased, the rolling amount RR of the rack bar 3 is increased. The displacement amount RD of the retainer 71 is increased in accordance with the rolling amount RR of the rack bar 3. That is, as shown in FIG. 7(*c*), the retainer 71 is further displaced toward the retainer second end portion 71*b* in accordance with the increase of the thrust RF of the rack bar 3 while the above-described inclination of the retainer 71 is maintained. With this, in the outer circumference edge of the retainer second end portion 71*b*, the outer circumference edge 710 on the inclination side of the retainer 71 is abutted on a spring holding member abutment surface 732 of the spring holding member 73 in a one side contact state.

In this case, in the conventional steering device, the outer circumference edge of the retainer second end portion 71*b* has the angular shape. Accordingly, the outer circumference edge of the retains second end portion 71*b* is abutted and caught on the spring holding member abutment surface 732 of the spring holding member 73. With this, the smooth movement of the rack bar 3 is interfered. Consequently, in the steering device in which the steering wheel (not shown) and the output shaft 22 are connected, this causes, for example, the unnatural feeling of the driver. On the other hand, in a steer-by-wire in which the steering wheel (not shown) and the output shaft 22 are not mechanically connected, the correct movement of the rack bar 3 with respect to command signal to the electric motor 4 configured to drive the rack bar 3 is interfered so that the steering characteristic is deteriorated.

Moreover, after the one side contact of the retainer second end portion 71*b*, the thrust RF of the rack bar 3 is started to be decreased as shown in "the state D" of FIG. 6. With this, the rolling amount RR of the rack bar 3 is instantaneously decreased. With this, the rack bar 3 is instantaneously displaced by the force F in a direction shown by the broken line arrow in FIG. 7(*d*). The retainer 71 is instantaneously displaced by the moment M in a direction shown by the solid line arrow shown in FIG. 7(*d*). That is, as shown in FIG. 7(*d*), the catch of the retainer second end portion 71*b* is released in accordance with the displacement of the retainer 71. The displacement amount RD of the retainer 71 is increased. The retainer second end portion 71*b* is seated on the spring holding member abutment surface 732.

Then, the rolling amount RR of the rack bar 3 is decreased in accordance with the seat of the retainer second end portion 71*b*. With this, the abutment surfaces between the pinion teeth portion 220 and the rack teeth portion 320 are slipped. Moreover, the abutment surfaces between the outer circumference edge of the retainer second end portion 71*b* and the spring holding member abutment surface 732 are slipped in accordance with the increase of the displacement amount RD of the retainer 71. Furthermore, the abutment surfaces between the outer circumference edge of the retainer first end portion 71*a* and the inner circumference surface of the retainer receiving portion 17 are slipped in accordance with the increase of the displacement amount RD of the retainer 71. That is, the noise may be generated due to the vibration caused by these slips, or the resonance by these vibrations.

Operations and Effects in this Embodiment

The steering device according to this embodiment attains the following effects. With this, it is possible to solve the problems of the conventional steering device.

That is, the steering device includes: a housing including a rack bar receiving portion 16, a pinion receiving portion 15, and a retainer receiving portion 17, the rack bar receiving portion 16 which has a cylindrical shape, and which is configured to receive a rod-shaped rack bar 3, the pinion receiving portion 15 which is connected to the rack bar receiving portion 16, and which is configured to receive a pinion shaft (the output shaft 22), a first axis (the X axis) defined as an axis which passes through a center of the rack bar 3 in a section perpendicular to a longitudinal direction of the rack bar 3, and which is parallel to the longitudinal direction of the rack bar 3, the retainer receiving portion 17 which has a cylindrical shape extending in a second axis (the Y axis) perpendicular to the first axis (the X axis), and which is configured to movably receive a retainer 71, the second axis (the Y axis) passing through a center of the retainer receiving portion 17 in a section perpendicular to the second axis (the Y axis), and the rack bar receiving portion 16 disposed between the pinion receiving portion 15 and the retainer receiving portion 17 in a section perpendicular to the longitudinal direction of the rack bar 3; the pinion shaft (the output shaft 22) including a pinion teeth portion 220; the rack bar 3 having the rod shape, and including a rack bar main body portion 31, a rack teeth portion 32, and a rack back surface portion 33, the rack teeth portion 32 provided to the rack bar main body portion 31, and configured to be engaged with the pinion teeth portion 220, and the rack back surface portion 33 which is provided to the rack bar main body portion 31, which has an arc shape in the section perpendicular to the first axis (the X axis), and which is formed on a side opposite to the rack teeth portion 32 with respect to the first axis (the X axis); a spring holding member 73 which is provided in the retainer receiving portion 17 to be apart from the rack bar 3 in the second axis (the Y axis) direction, and which includes a spring holding member main body portion 731 and a spring holding member abutment surface 732, the spring holding member main body portion 731 including a pair of end portions in the second axis (the Y axis) direction, the pair of the end portions including a spring holding member first end portion 73*a* and a spring holding member second end portion 73*b*, and the spring holding member abutment surface 732 provided to the spring holding member first end portion 73*a* near the rack bar 3; a spring 72 configured to urge the retainer 71 toward the rack bar 3 in the second axis (the Y axis) direction, and the rack bar 3, the retainer 71, the spring 72, and the spring holding member 73 being disposed in this order in the second axis (the Y axis) direction; the retainer 71 including a retainer main body portion 711, a retainer abutment portion 712, and a retainer chamfering portion 713, the retainer abutment portion 712 which has an arc shape in a section that passes through the second axis (the Y axis), and that is perpendicular to the first axis (the X axis), and which is configured to be abutted on the rack back surface portion 33, the retainer main body portion 711 including a pair of end portions in the second axis (the Y axis) direction, the pair of the end portions including a retainer first end portion 71*a* and a retainer second end portion 71*b*, the retainer chamfering portion 713 provided on the retainer second end portion 71*b* near the spring holding member 73, on a retainer second end portion outer circumference portion (an outer circumference edge of the retainer second end portion 71*b*) which is an outer circumference edge of the retainer main body portion 711 in a section perpendicular to the second axis (the Y axis), and the retainer chamfering portion 713 formed at a portion which is nearest the spring holding member abutment surface 732 in the retainer second end portion outer circumference portion (the outer circumference edge of the retainer second end portion 71*b*) in a section that passes through the second axis (the Y axis), and that is perpendicular to the first axis (the X axis), when the retainer main body portion 711 is inclined with respect to the second axis (the Y axis).

In this way, in this embodiment, the retainer second end portion outer circumference portion (the outer circumference edge of the retainer second end portion 71b) includes the retainer chamfering portion 713. The catching between the retainer second end portion outer circumference portion (the outer circumference edge of the retainer second end portion 71b), and the spring holding member abutment surface 732. With this, it is possible to ensure the smooth movement of the rack bar 3.

Moreover, in this embodiment, the retainer chamfering portion 713 is a round chamfering.

For example, in a case where the retainer chamfering portion 713 is formed by C chamfering, angular portions are formed on both sides of the retainer chamfering portion 713. On the other hand, in this embodiment, the retainer chamfering portion 713 is formed by the round chamfering. With this, the angular portions are not formed on the both sides of the retainer chamfering portion 713 like the C chamfering. Accordingly, it is possible to more effectively suppress the catching between the retainer second end portion outer circumference portion (the outer circumference edge of the retainer second end portion 71b) and the spring holding member abutment surface 732.

Moreover, in this embodiment, the spring holding member 73 includes a spring holding portion (the spring second end portion receiving portion 733); the spring holding portion (the spring second end portion receiving portion 733) is provided in a region including the second axis (the Y axis) in the section perpendicular to the second axis (the Y axis); the spring 72 includes a pair of end portions in the second axis (the Y axis); the pair of the end portions includes a spring first end portion 72a and a spring second end portion 72b; the spring holding portion (the spring second end portion receiving portion 733) is configured to be abutted on the spring second end portion 72b farther from the rack bar 3; and the spring holding member abutment surface 732 is provided outside the spring holding portion (the spring second end portion receiving portion 733) in a radial direction of the second axis (the Y axis); the spring holding member abutment surface 732 has a shape parallel to a plane perpendicular to the second axis (the Y axis).

For example, in a case where the spring holding member 732 has a mortar shape, the retainer second end portion outer circumference portion (the outer circumference edge of the retainer second end portion 71b) and the spring holding member abutment surface 732 are easy to be abutted on each other. Accordingly, in this embodiment, the spring holding member abutment surface 732 has a flat shape. With this, it is possible to suppress the abutment between the retainer second end portion outer circumference portion (the outer circumference edge of the retainer second end portion 71b) and the spring holding member abutment surface 732. Moreover, even when the retainer second end portion outer circumference portion (the outer circumference edge of the retainer second end portion 71b) and the spring holding member abutment surface 732 are abutted on each other, it is possible to suppress the increase of the surface pressure in accordance with the abutment.

Moreover, in this embodiment, the steering device includes a retainer holding member 76; the retainer holding member 76 is an O ring; the retainer 71 includes a retainer holding member holding groove 714; the retainer holding member holding groove 714 is formed on an outer circumference side of the retainer 71; the retainer holding member holding groove 714 has an annular groove shape extending in a circumferential direction of the second axis (the Y axis); and the retainer holding member holding groove 714 is provided at a position farther from the rack bar 3 than a middle point of the retainer 71 in the second axis (the Y axis) direction.

By this configuration, in this embodiment, the retainer 71 is configured to swung around the retainer holding member which is the swing center. In this case, a distance Lr1 from the swing center to the retainer abutment portion 712 is longer than a length Lr2 from the swing center to the retainer second end portion 71b. That is, a length between the fulcrum and the force point when the retainer 71 is swung becomes relatively long. With this, the force for swinging the retainer 71 is largely acted. Accordingly, it is possible to smoothly move the retainer 71 even in a state where the retainer second end portion outer circumference portion (the outer circumference edge of the retainer second end portion 71b) and the spring holding member abutment surface 732 are slidably abutted on each other.

Moreover, in this embodiment, the retainer 71 has an outside diameter D1 with respect to the second axis (the Y axis) of the retainer 71; the outside diameter D1 of the retainer 71 is smaller than an inside diameter D3 of the retainer receiving portion 17 with respect to the second axis (the Y axis) by a first length; the spring holding member 73 is provided within the retainer receiving portion 17 so that the retainer second end portion 71b and the spring holding member abutment surface 732 are apart from each other in the second axis (the Y axis) direction by a second length when the rack bar 3 is in a static state; and an equation: $L1/2<L2$ is satisfied where the first length is L1, and the second length is L2.

In this way, in this embodiment, a radial clearance between the retainer 71 and the retainer receiving portion 17 is sufficiently small. With this, it is possible to restrict the swing range of the retainer 71, and to stabilize the inclination of the retainer 71 at an early timing.

Moreover, in this embodiment, the spring holding member 73 is formed by forging by using a die (not shown); and the spring holding member abutment surface 732 includes a plastic machined surface formed by the die.

In this way, in this embodiment, the spring holding member abutment surface 732 is formed by the forging by using the die. Accordingly, the surface is smooth. Consequently, it is possible to more effectively suppress the catching between the retainer second end portion outer circumference portion (the outer circumference edge of the retainer second end portion 71b) and the spring holding member abutment surface 732.

Moreover, in this embodiment, the retainer 71 has an outside diameter D1 with respect to the second axis (the Y axis) of the retainer 71; and the outside diameter D1 of the retainer 71 is smaller than an outside diameter D2 of the spring holding member abutment surface 732 with respect to the second axis (the Y axis).

In this way, in this embodiment, at least the outside diameter D1 of the retainer second end portion 71b of the retainer 71 is smaller than the outside diameter D2 of the spring holding member abutment surface 732. Accordingly, it is possible to suppress the abutment between the retainer second end portion outer circumference portion (the outer circumference edge of the retainer second end portion 71b) and the outer circumference edge (the angular portion) of the spring holding member first end portion 73a. Consequently, it is possible to smoothen the movement of the retainer 71, and to more effectively ensure the smooth movement of the rack bar 3.

Moreover, in this embodiment, the retainer chamfering portion 713 is formed on the entire circumference of the retainer second end portion outer circumference portion (the outer circumference edge of the retainer second end portion 71b).

In this way, in this embodiment, the retainer chamfering portion 713 is formed on the entire circumference of the retainer second end portion outer circumference portion (the outer circumference edge of the retainer second end portion 71b). With this, the processing becomes easier relative to a case where the retainer chamfering portion 713 is partially formed in the circumferential direction. Moreover, the retainer chamfering portion 713 is formed on the entire circumference. With this, it is possible to suppress the catching between the outer circumference edge of the retainer second end portion 71b and the spring holding member abutment surface 732 with respect to the pestle movement, in addition to the movement in the swing direction of the retainer 71. Accordingly, it is possible to more effectively ensure the smooth movement of the rack bar 3.

Besides, as described above, the retainer chamfering portion 713 may be partially formed at a predetermined portion of the retainer second end portion outer circumference portion (the outer circumference edge of the retainer second end portion 71b). That is, the retainer chamfering portion 713 may be formed on two portions of the retainer second end portion outer circumference portion (the outer circumference edge of the retainer second end portion 71b) crossing a section which passes through the second axis (the Y axis), and which is parallel to the first axis (the X axis).

The rack bar 3 is configured to be moved in the both directions of the leftward and rightward directions of the vehicle. Accordingly, when the retainer main body portion 711 is inclined, the portion of the outer circumference edge of the retainer second end portion 71b which is nearest the spring holding member abutment surface 732 is at least the above-described two portions. Therefore, as described above, the retainer chamfering portion 713 is formed at least on the two portions. With this, it is possible to suppress the catching between the outer circumference edge of the retainer second end portion 71b and the spring holding member abutment surface 732, and to ensure the smooth movement of the rack bar 3.

First Variation

FIG. 8 shows a steering device according to a first variation of the first embodiment of the present invention. Besides, in this variation, a forming region of the retainer chamfering portion 713 in a longitudinal section of the retainer 71 is varied. Other configurations are identical to those of the first embodiment. Accordingly, the configuration identical to those of the first embodiment has the same symbols. The explanation thereof are omitted.

Figure 8A:
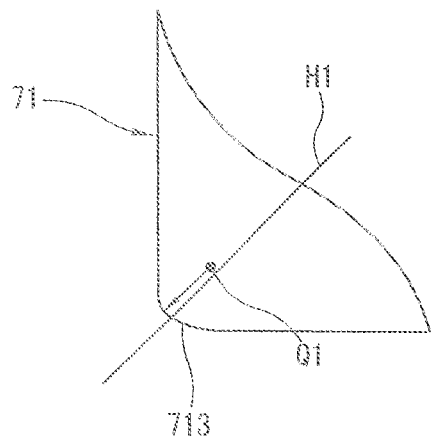
FIG. 8(a) shows a case where a center of a radius of curvature of the retainer chamfering portion is provided near the rack bar.
Figure 8B:
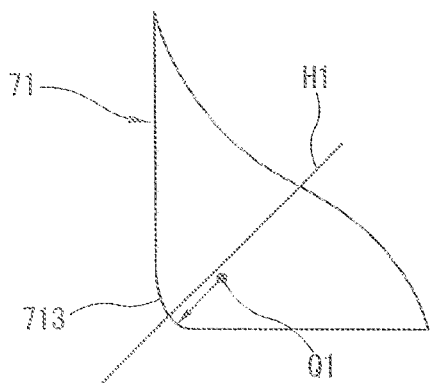
FIG. 8(b) shows a case where the center of the radius of the curvature of the retainer chamfering portion is provided near a spring holding member.

FIG. 8 shows the steering device according to the first variation of the first embodiment of the present invention. FIG. 8 are enlarged sectional views showing the retainer chamfering portion 713. FIG. 8(a) shows a case where a center Q1 of a radius of curvature is disposed near the rack bar 3. FIG. 8(b) shows a case where the center Q1 of the radius of the curvature is disposed near the spring holding member 73.

As shown in FIG. 8(a), in this embodiment, the retainer chamfering portion 713 is eccentrically provided near the retainer second end portion 71b. In particular, in the retainer chamfering portion 713 according to this variation, the center Q1 of the retainer chamfering portion 713 is positioned on the rack bar 3 side of the bisector H1 of the angle of the retainer second end portion 71b.

As shown in FIG. 8(b), in a case where the center Q1 of the retainer chamfering portion 713 is positioned on the spring holding member 73 side of the bisector H1 of the angle of the retainer second end portion 71b, the retainer chamfering portion 713 is eccentrically positioned near the rack bar 3. Consequently, the retainer chamfering portion 713 is not formed in a region which is near the end surface of the retainer second end portion 71b, and which may be abutted on the spring holding member abutment surface 732. The outer circumference edge of the retainer second end portion 71b may be caught by the spring holding member abutment surface 732.

Accordingly, in this embodiment, when the bisector H1 of the angle of the retainer second end portion 71b is drawn in a section of the retainer chamfering portion 713 which passes through the second axis (the Y axis), and which is perpendicular to the first axis (the X axis), the center Q1 of the radius of the curvature of the round chamfering of the retainer chamfering portion 713 is positioned on the rack bar 3 side of the bisector H1 of the angle of the retainer second end portion 71b.

In this way, the center Q1 of the radius of the curvature of the round chamfering of the retainer chamfering portion 713 is positioned on the rack bar 3 side of the bisector H1 of the angle of the retainer second end portion 71b. With this, it is possible to increase the region of the retainer chamfering portion 713 in the region near the end surface of the retainer second end portion 71b which may be abutted on the spring holding member abutment surface 732. With this, it is possible to more effectively suppress the catching between the outer circumference edge of the retainer second end portion 71b and the spring holding member abutment surface 732.

Second Variation

Figure 9A:
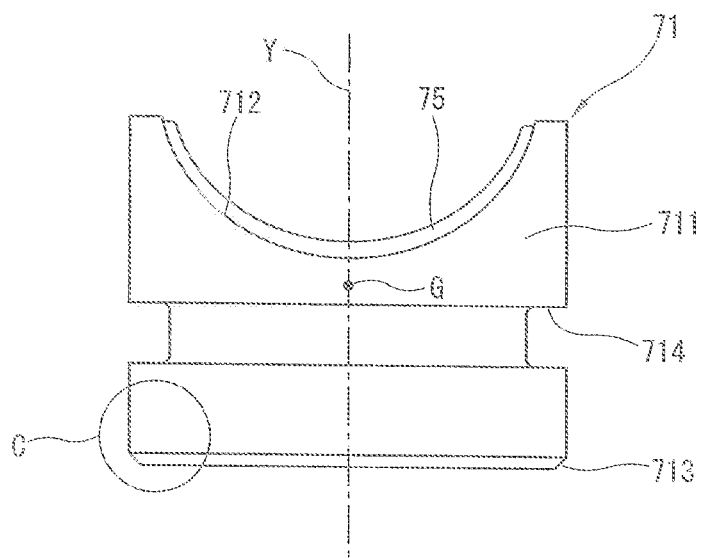
FIG. 9(a) is a side view of the retainer.
Figure 9B:
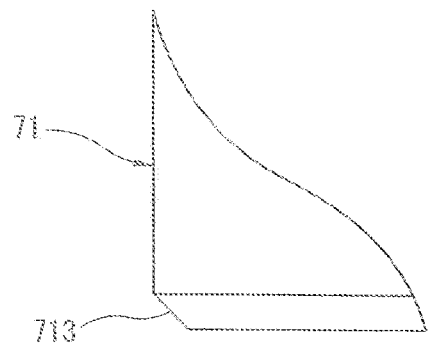
FIG. 9(b) is an enlarged view showing a C portion of FIG. 9(a).

FIG. 9 shows a steering device according to a second variation of the first embodiment of the present invention. Besides, in this variation, a configuration of the retainer chamfering portion 713 is varied. Other configurations are identical to those of the first embodiment. Accordingly, the configuration identical to those of the first embodiment has the same symbols. The explanation thereof are omitted.

FIG. 9 shows the retainer chamfering portion 713 according to the second variation of the first embodiment of the present invention. FIG. 9(a) is a side view showing the retainer 71. FIG. 7(b) is an enlarged view showing a C portion in FIG. 7(a).

As shown in FIG. 9, in this variation, the retainer chamfering portion 713 is not formed by the round chamfering (the chamfering described by "R") in the first embodiment. The retainer chamfering portion 713 is formed by plane chamfering described by "C".

In this way, in a case where the retainer chamfering portion 713 is formed by the C chamfering, it is possible to suppress the catching between the outer circumference edge of the retainer second end portion 71b and the spring holding member abutment surface 732, and to ensure the smooth movement of the rack bar 3, similarly to the first embodiment.

Second Embodiment

Figure 10:
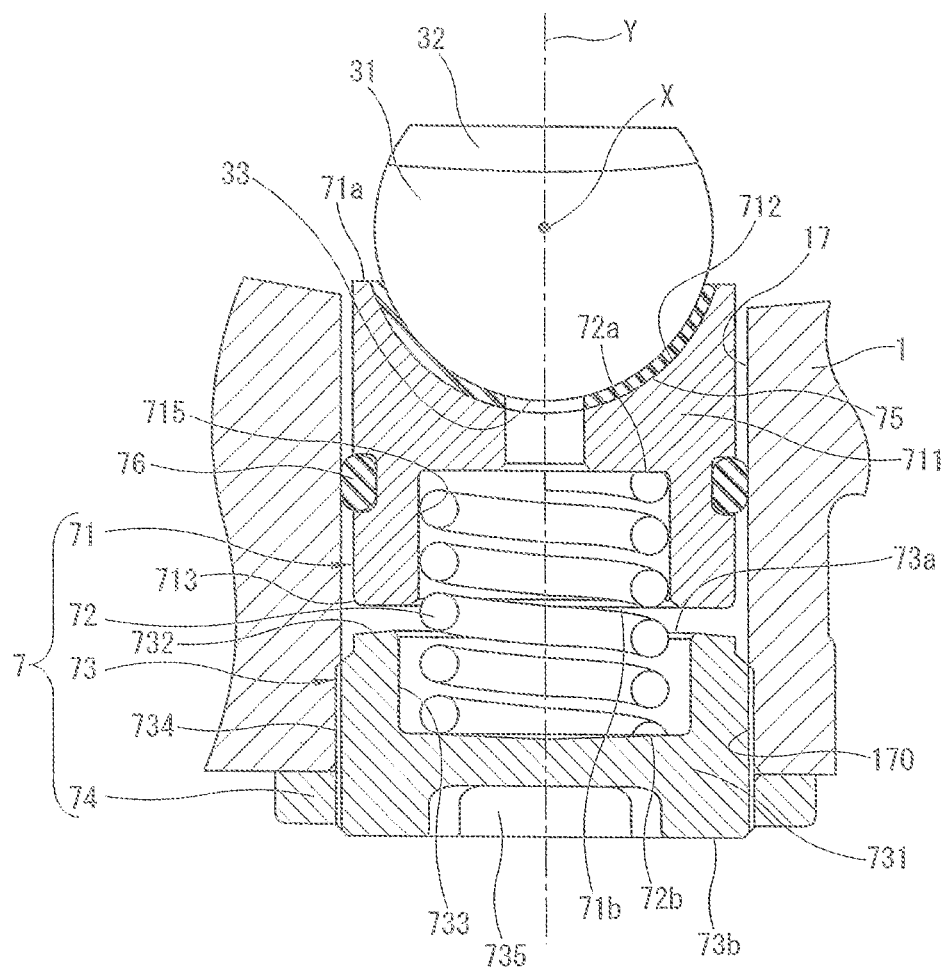
FIG. 10 is an enlarged sectional view showing a portion near an adjustment mechanism in a second embodiment of the present invention.

FIG. 10 to FIG. 12 show a steering device according to a second embodiment of the present invention. Besides, in this embodiment, a configuration of the spring holding member 73 in the first embodiment is varied. Other configurations are identical to those of the first embodiment. Accordingly, the configuration identical to those of the first embodiment has the same symbols. The explanation thereof are omitted.

(Configuration of Steering Device)

Figure 11A:
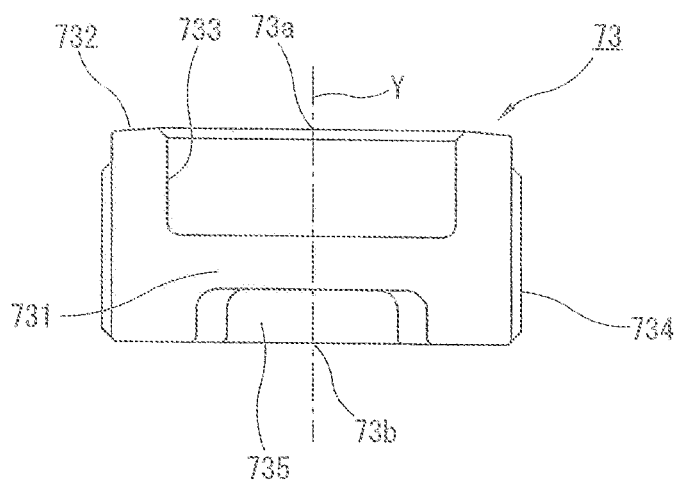
FIG. 11(a) is a side view showing a spring holding member according to a second embodiment of the present invention.
Figure 11B:
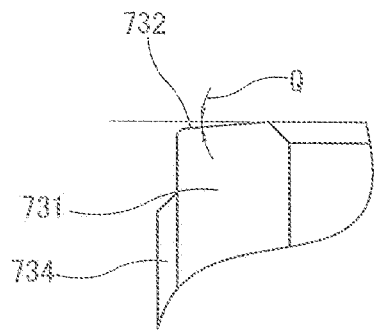
FIG. 11(b) is an enlarged view showing a D portion of FIG. 11(a).

FIG. 10 is an enlarged sectional view showing a portion near the adjustment mechanism 7 in this embodiment. Moreover, FIG. 11 are views showing the spring holding member according to this embodiment. FIG. 11(a) is a side view showing the spring holding member 73. FIG. 11(b) is an enlarged view showing a D portion in FIG. 11(a).

As shown in FIG. 10 and FIG. 11, in this steering device according to this embodiment, the spring holding member abutment surface 732 has a conical trapezoid shape inclined to be gradually closer to the rack bar 3 from the outside to the inside in the radial direction of the second axis (the Y axis). That is, the spring holding member abutment surface 732 is inclined so that a distance between the spring holding member abutment surface 732 and the retainer 71 is gradually increased from the inside to the outside in the radial direction of the second axis (the Y axis). In particular, as shown in FIG. 11(b) the spring holding member abutment surface 732 is inclined by an angle θ on the spring holding member second end portion 73b side from the inner circumference side to the outer circumference side with respect to the horizontal end surface of the spring holding member first end portion 73a.

(Posture Variation of Retainer at Sliding Movement of Rack Bar)

FIG. 12 are views showing the posture variations of the retainer 71 in this embodiment. FIG. 12 are enlarged views showing a main portion of the steering device. FIG. 12(a) shows a state A of FIG. 5. FIG. 12(b) shows a state B of FIG. 5. FIG. 12(c) shows a state C of FIG. 5. FIG. 12(d) shows a state D of FIG. 5.

Figure 12A:
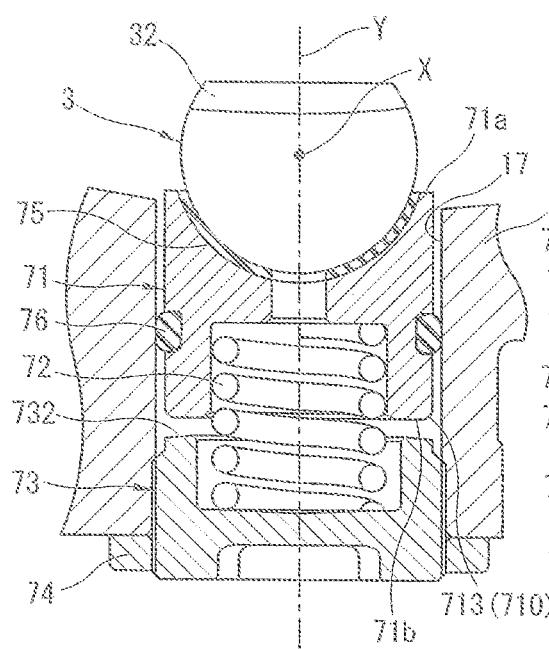
FIG. 12(a) shows the state A of FIG. 5.
Figure 12B:
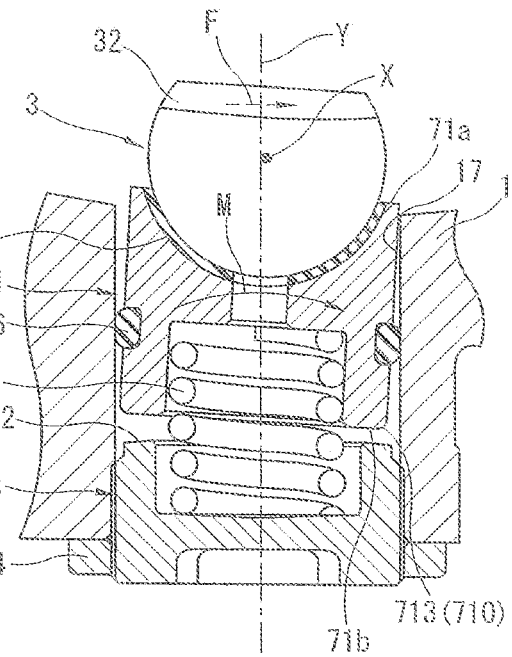
FIG. 12(b) shows the state B of FIG. 5.
Figure 12C:
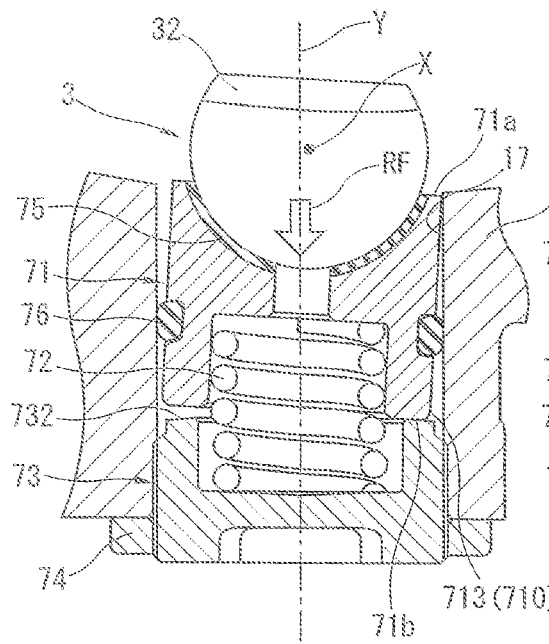
FIG. 12(c) shows the state C of FIG. 5.

Firstly, as shown in FIG. 12(a), when the rack bar 3 is in the static state, the retainer 71 is not inclined. The retainer 71 is straightly (vertically) abutted on the rack bar 3 along the Y axis direction which is the second axis. Next, as shown in FIG. 12(b), when the rack bar 3 is started to be slidably moved, the moment M shown by a solid line arrow in FIG. 12(b) is acted to the retainer 71 due to the component force F acted to the rack teeth portion 32. Consequently, the retainer 71 is inclined in the direction shown by FIG. 12(b) around the retainer holding member 76 which is the fulcrum. Then, as shown in FIG. 12(c), when the thrust RF of the rack bar 3 is further increased, the retainer 71 is further displaced toward the retainer second end portion 71b in accordance with the increase of the thrust RF of the rack bar 3 while the above-described inclination of the retainer 71 is maintained. With this, in the outer circumference edge of the retainer second end portion 71b, the outer circumference edge 710 on the inclination side of the retainer 71 is abutted on the spring holding member abutment surface 732 of the spring holding member 73 in the one side contact state.

Figure 12D:
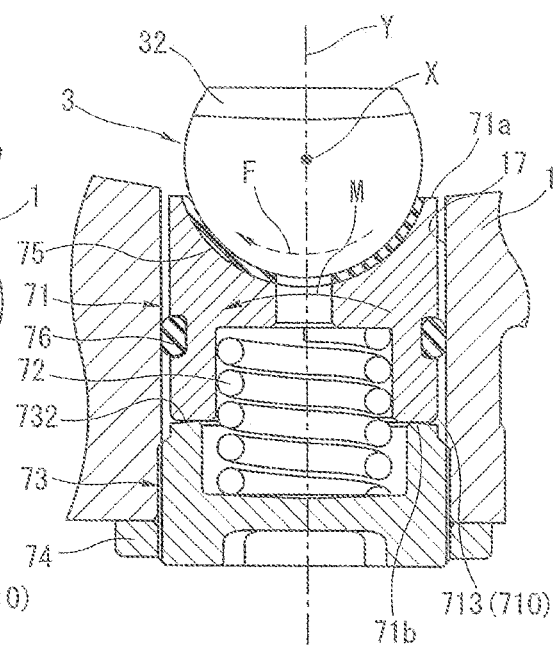
FIG. 12(d) shows the state D of FIG. 5.

In this case, the steering device according to this embodiment, the spring holding member abutment surface 732 has the inclination shape so that the separation distance from the retainer 71 is increased from the inner circumference side to the outer circumference side. Accordingly, it is possible to suppress the catching between the outer circumference edge of the retainer second end portion 71b and the spring holding member abutment surface 732, by the inclination amount. With this, as shown in FIG. 12(d), the force F is acted in a direction where the rolling amount RR of the rack bar 3 is decreased. The moment M is acted to the retainer 71 in a direction where the inclination is suppressed. With this, the retainer second end portion 71b is smoothly seated on the spring holding member abutment surface 732. It is possible to ensure the smooth movement of the rack bar 3.

As described above, in this embodiment, the spring holding member 73 includes a spring holding portion (the spring second end portion receiving portion 733); the spring holding portion (the spring second end portion receiving portion 733) is provided in a region including the second axis (the Y axis) in the section perpendicular to the second axis (the Y axis); the spring 72 includes a pair of end portions in the second axis (the Y axis); the pair of the end portions includes a spring first end portion 72a and a spring second end portion 72b; the spring holding portion (the spring second end portion receiving portion 733) is configured to be abutted on the spring second end portion 72b farther from the rack bar 3; and the spring holding member abutment surface 732 has a conical trapezoid shape inclined to be gradually closer to the rack bar 3 from the outside to the inside in the radial direction of the second axis (the Y axis).

In this way, in this embodiment, the spring holding member abutment surface 732 has the inclination shape to be gradually closer to the rack bar 3 from the outer circumference side to the inner circumference side. Accordingly, it is possible to suppress the catching between the retainer second end portion outer circumference portion (the outer circumference edge of the retainer second end portion 71b) and the spring holding member abutment surface 732, by the inclination amount, and to ensure the smooth movement of the rack bar 3.

Moreover, the spring holding member abutment surface 732 has the above-described inclination shape. Accordingly, even when the retainer second end portion outer circumference portion (the outer circumference edge of the retainer second end portion 71b) and the spring holding member abutment surface 732 are abutted on each other, it is possible to suppress the increase of the surface pressure in accordance with this abutment. Therefore, it is possible to ensure the posture variation of the retainer 71, and to ensure the smooth movement of the rack bar 3.

Third Embodiment

FIG. 13 show a steering device according to a third embodiment of the present invention. Besides, in this embodiment, a configuration of the spring holding member 73 in the first embodiment is varied. Other configurations are identical to those of the first embodiment. Accordingly, the configuration identical to those of the first embodiment has the same symbols. The explanation thereof are omitted.

Figure 13A:
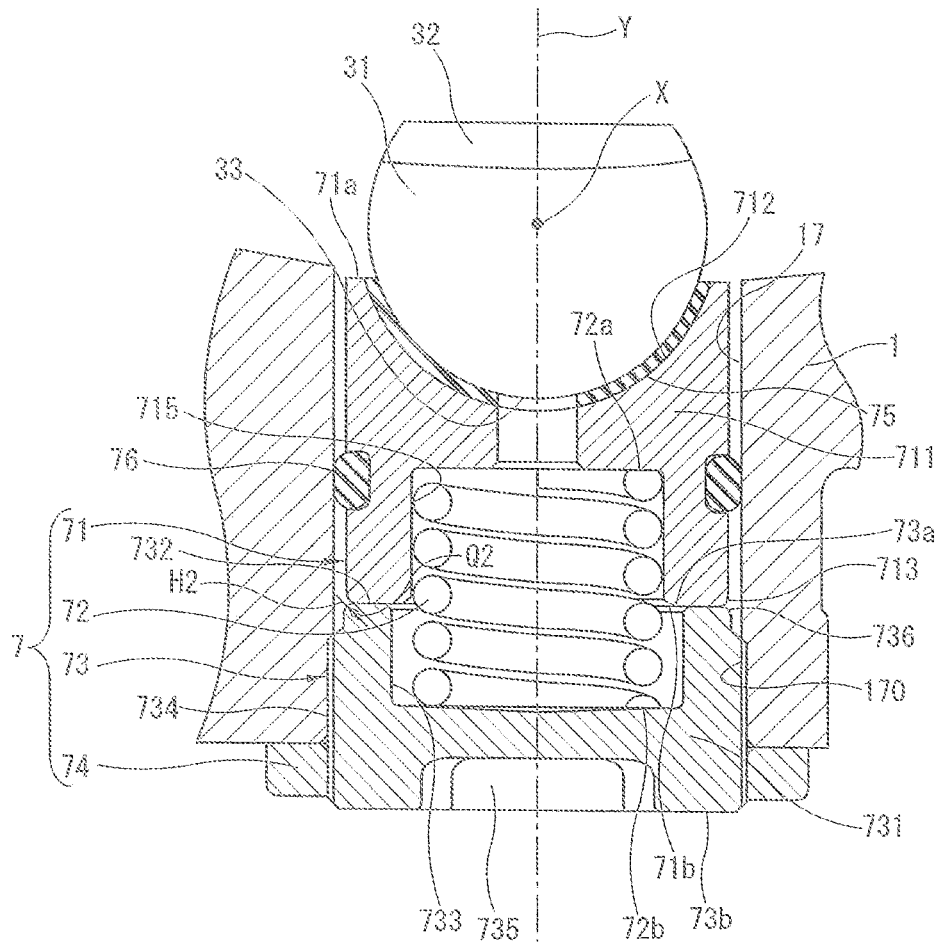
FIG. 13(a) is an enlarged sectional view showing a portion near an adjustment mechanism according to a third embodiment of the present invention.
Figure 13B:
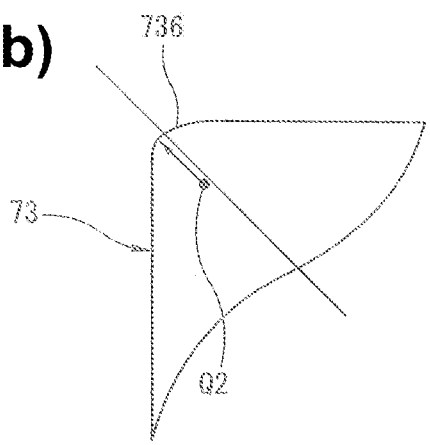
FIGS. 13(b) and 13(c) are enlarged views showing a spring holding member first end portion outer circumference portion.
Figure 13C:
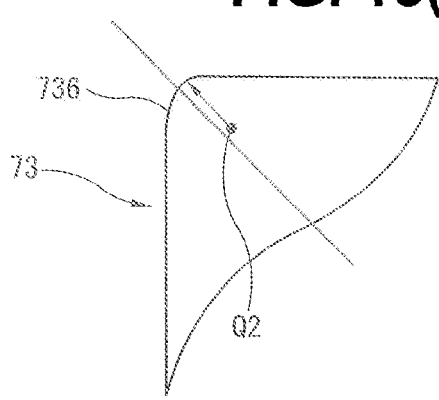

FIG. 13 are enlarged views showing the spring holding member first end portion outer circumference portion. FIG. 13(a) is an enlarged sectional view showing a portion near the adjustment mechanism according to the third embodiment of the present invention. FIG. 13(b) shows a case where a center of the radius of the curvature of the spring holding member chamfering portion is provided near the retainer. FIG. 13(c) shows a case where the center of the radius of the curvature of the spring holding member chamfering portion is provided near the fixing member.

In particular, as shown in FIG. 13(a), in the steering device according to this embodiment, the spring holding member 73 includes a spring holding member chamfering portion 736 formed on the outer circumference edge of the spring holding member abutment surface 732. The spring holding member chamfering portion 736 is the round chamfering, similarly to the retainer chamfering portion 713. The spring holding member chamfering portion 736 has an arc shape in the longitudinal section. A center Q2 of the radius of the curvature of the spring holding member chamfering portion 736 is disposed on a bisector H2 of the angle of the spring holding member first end portion 73a.

Besides, it is preferable that the spring holding member chamfering portion 736 is eccentrically provided near the retainer 71 as shown in FIG. 13(b). In particular, it is preferable that the spring holding member chamfering portion 736 has a shape so that the center Q2 of the radius of the curvature of the spring holding member chamfering portion 736 is positioned on the fixing member 74 side of the bisector H2 of the angle of the spring holding member first end portion 73a.

On the other hand, as shown in FIG. 13(c), in a case where the center Q2 of the radius of the curvature of the spring holding member chamfering portion 736 is positioned on the retainer 71 side of the bisector H2 of the angle of the spring holding member first end portion 73a, the spring holding member chamfering portion 736 is eccentrically positioned near the fixing member 74 (on a side opposite to the retainer 71). Consequently, the spring holding member chamfering portion 736 is not formed in a region which is near the spring holding member abutment surface 732, and which may be abutted on the outer circumference edge of the retainer second end portion 71b, so that the spring holding member chamfering portion 736 may not function effectively.

As described above, in this embodiment, the spring holding member 73 includes a spring holding member chamfering portion 736; and the spring holding member chamfering portion 736 is provided on an outer circumference edge of the spring holding member abutment surface 732 in a section perpendicular to the second axis (the Y axis).

In this way, the spring holding member chamfering portion 736 is formed on the outer circumference edge of the spring holding member abutment surface 732. With this, it is possible to more effectively suppress the catching between the outer circumference edge of the retainer second end portion 71b and the spring holding member abutment surface 732, relative to the first embodiment in which the only retainer chamfering portion 713 is provided.

Besides, this configuration including the spring holding member chamfering portion 736 is more effective in a case where the outside diameter D1 of the spring holding member first end portion 73a (cf. FIG. 3) is smaller than the outside diameter D2 of the retainer second end portion 71b (cf. FIG. 3), and where the outer circumference edge of the spring holding member first end portion 73a is abutted on the end surface of the retainer second end portion 71b at the inclination of the retainer 71. In this way, in a case where the outside diameter D1 of the spring holding member first end portion 73a is smaller than the outside diameter D2 of the retainer second end portion 71b, the spring holding member chamfering portion 736 is abutted on the end surface of the retainer second end portion 71b at the inclination of the retainer 71. With this, it is possible to suppress the catching between the outer circumference edge of the spring holding member first end portion 71a and the retainer second end portion 71b by the roundness of the spring holding member chamfering portion 736, and to ensure the smooth movement of the rack bar 3.

As a reference example according to the present invention, the retainer chamfering portion 713 is not formed on the retainer 71. The spring holding member chamfering portion 736 is formed only on the spring holding member 73. With this, it is possible to suppress the abutment between the outer circumference edge (the angle) of the retainer second end portion 71b and the outer circumference edge of the spring holding member first end portion 73a, and to ensure the smooth movement of the rack bar 3.

Moreover, the center Q2 of the radius of the curvature of the spring holding member chamfering portion 736 is positioned on the fixing member 74 side of the bisector H2 of the angle of the spring holding member first end portion 73a. With this, it is possible to increase the region of the spring holding member chamfering portion 736 in the region near the spring holding member abutment surface 732. With this, it is possible to more effectively suppress the catching between the outer circumference edge of the retainer second end portion 71b and the spring holding member abutment surface 732.

The present invention is not limited to the embodiments. Variations will freely occur in accordance with specifications and so on of the steering device to which the present invention is applied as long as they can attain the operations and the effects in the present invention.

For example, the steering device to which the present invention is applied is not limited to the steering device in which the steering shaft 3 is mechanically connected through the rack bar 3 to the steered wheels (not shown) to transmit the rotation of the steering shaft 2 to the steered wheels. That is, the steering device to which the present invention is applied includes a steering device in which the steering shaft 2 and the steered wheels are not mechanically connected. That is, the present invention is applicable to a steer-by-wire type in which the rotation angle and the torque of the input shaft 21 is transmitted by the electric signal, and in which the output shaft 22 is rotated by the rotation of the controlled and driven electric motor 4.

For example, below-described aspects are conceivable as the steering device according to the above-described embodiment.

That is, the steering device according to one aspect includes a housing including a rack bar receiving portion, a pinion receiving portion, and a retainer receiving portion, the rack bar receiving portion which has a cylindrical shape, and which is configured to receive a rod-shaped rack bar, the pinion receiving portion which is connected to the rack bar receiving portion, and which is configured to receive a pinion shaft, a first axis defined as an axis which passes through a center of the rack bar in a section perpendicular to a longitudinal direction of the rack bar, and which is parallel to the longitudinal direction of the rack bar, the retainer receiving portion which has a cylindrical shape extending in a second axis perpendicular to the first axis, and which is configured to movably receive a retainer, the second axis passing through a center of the retainer receiving portion in a section perpendicular to the second axis, and the rack bar receiving portion disposed between the pinion receiving portion and the retainer receiving portion in a section perpendicular to the longitudinal direction of the rack bar; the pinion shaft including a pinion teeth portion; the rack bar having the rod shape, and including a rack bar main body portion, a rack teeth portion, and a rack back surface portion, the rack teeth portion provided to the rack bar main body portion, and configured to be engaged with the pinion teeth portion, and the rack back surface portion which is provided to the rack bar main body portion, which has an arc shape in the section perpendicular to the first axis, and which is formed on a side opposite to the rack teeth portion with respect to the first axis; a spring holding member which is provided in the retainer receiving portion to be apart from the rack bar in the second axis direction, and which includes a spring holding member main body portion and a spring holding member abutment surface, the spring holding member main body portion including a pair of end portions in the second axis direction, the pair of the end portions including a spring holding member first end portion and a spring holding member second end portion, and the spring holding member abutment surface provided to the spring holding member first end portion near the rack bar; a spring configured to urge the retainer toward the rack bar in the second axis direction, and the rack bar, the retainer, the spring, and the spring holding member being disposed in this order in the second axis direction; the retainer including a retainer main body portion, a retainer abutment portion, and a retainer chamfering portion, the retainer abutment portion which has an arc shape in a section that passes through the second axis, and that is perpendicular to the first axis, and which is configured to be abutted on the rack back surface portion, the retainer main body portion including a pair of end portions in the second axis direction, the pair of the end portions including a retainer first end portion and a retainer second end portion, the retainer chamfering portion provided on the retainer second end portion near the spring holding member, on a retainer second end portion outer circumference portion which is an outer circumference edge of the retainer main body portion in a section perpendicular to the second axis, and the retainer chamfering portion formed at a portion which is nearest the spring holding member abutment surface in the retainer second end portion outer circumference portion in a section that passes through the second axis, and that is perpendicular to the first axis, when the retainer main body portion is inclined with respect to the second axis.

In the steering device according to a preferable aspect, the retainer chamfering portion is a round chamfering.

In the steering device according to another preferable aspect, when a bisector of an angle of the retainer second end portion is drawn in a section of the retainer chamfering portion which passes through the second axis, and which is perpendicular to the first axis, a center of a radius of curvature of the round chamfering of the retainer chamfering portion is positioned on the rack bar side of the bisector of the angle of the retainer second end portion.

In the steering device according to still another preferable aspect, the spring holding member includes a spring holding portion; the spring holding portion is provided in a region including the second axis in the section perpendicular to the second axis; the spring includes a pair of end portions in the second axis; the pair of the end portions includes a spring first end portion and a spring second end portion; the spring holding portion is configured to be abutted on the spring second end portion farther from the rack bar; and the spring holding member abutment surface is provided outside the spring holding portion in a radial direction of the second axis; the spring holding member abutment surface has a shape parallel to a plane perpendicular to the second axis, or a conical trapezoid shape inclined to be gradually closer to the rack bar from an outside to an inside in the radial direction of the second axis.

In the steering device according to still another preferable aspect, the steering device includes a retainer holding member; the retainer holding member is an O ring; the retainer includes a retainer holding member holding groove; the retainer holding member holding groove is formed on an outer circumference side of the retainer; and the retainer holding member holding groove has an annular groove shape extending in a circumferential direction of the second axis; and the retainer holding member holding groove is provided at a position farther from the rack bar than a middle point of the retainer in the second axis direction.

In the steering device according to still another preferable aspect, the retainer has an outside diameter with respect to the second axis of the retainer; the outside diameter of the retainer is smaller than an inside diameter of the retainer receiving portion with respect to the second axis by a first length; the spring holding member is provided within the retainer receiving portion so that the retainer second end portion and the spring holding member abutment surface are apart from each other in the second axis direction by a second length when the rack bar is in a static state; and an equation: $L1/2<L2$ is satisfied where the first length is L1, and the second length is L2.

In the steering device according to still another preferable aspect, the spring holding member is formed by forging by using a die; and the spring holding member abutment surface includes a plastic machined surface formed by the die.

In the steering device according to still another preferable aspect, the retainer has an outside diameter with respect to the second axis of the retainer; and the outside diameter of the retainer is smaller than an outside diameter of the spring holding member abutment surface with respect to the second axis.

In the steering device according to still another preferable aspect, the spring holding member includes a spring holding member chamfering portion; and the spring holding member chamfering portion is provided on an outer circumference edge of the spring holding member abutment surface in a section perpendicular to the second axis.

In the steering device according to still another preferable aspect, the retainer chamfering portion is formed on two portions of the retainer second end portion outer circumference portion crossing a section which passes through the second axis, and which is parallel to the first axis.

In the steering device according to still another preferable aspect, the retainer chamfering portion is formed on an entire circumference of the retainer second end portion outer circumference portion.

The invention claimed is:
1. A steering device comprising:
a housing including a rack bar receiving portion, a pinion receiving portion, and a retainer receiving portion,
the rack bar receiving portion which has a cylindrical shape, and which is configured to receive a rod-shaped rack bar,
the pinion receiving portion which is connected to the rack bar receiving portion, and which is configured to receive a pinion shaft,
a first axis defined as an axis which passes through a center of the rack bar in a section perpendicular to a longitudinal direction of the rack bar, and which is parallel to the longitudinal direction of the rack bar,
the retainer receiving portion which has a cylindrical shape extending in a second axis perpendicular to the first axis, and which is configured to movably receive a retainer,
the second axis passing through a center of the retainer receiving portion in a section perpendicular to the second axis, and
the rack bar receiving portion disposed between the pinion receiving portion and the retainer receiving portion in a section perpendicular to the longitudinal direction of the rack bar;
the pinion shaft including a pinion teeth portion;

the rack bar having the rod shape, and including a rack bar main body portion, a rack teeth portion, and a rack back surface portion, the rack teeth portion provided to the rack bar main body portion, and configured to be engaged with the pinion teeth portion, and the rack back surface portion which is provided to the rack bar main body portion, which has an arc shape in the section perpendicular to the first axis, and which is formed on a side opposite to the rack teeth portion with respect to the first axis;

a spring holding member which is provided in the retainer receiving portion to be apart from the rack bar in the second axis direction, and which includes a spring holding member main body portion and a spring holding member abutment surface, the spring holding member main body portion including a pair of end portions in the second axis direction, the pair of the end portions including a spring holding member first end portion and a spring holding member second end portion, and the spring holding member abutment surface provided to the spring holding member first end portion near the rack bar;

a spring configured to urge the retainer toward the rack bar in the second axis direction, and the rack bar, the retainer, the spring, and the spring holding member being disposed in this order in the second axis direction;

the retainer including a retainer main body portion, a retainer abutment portion, and a retainer chamfering portion, the retainer abutment portion which has an arc shape in a section that passes through the second axis, and that is perpendicular to the first axis, and which is configured to be abutted on the rack back surface portion, the retainer main body portion including a pair of end portions in the second axis direction, the pair of the end portions including a retainer first end portion and a retainer second end portion, the retainer chamfering portion provided on the retainer second end portion near the spring holding member, on a retainer second end portion outer circumference portion which is an outer circumference edge of the retainer main body portion in a section perpendicular to the second axis, and the retainer chamfering portion formed at a portion which is nearest the spring holding member abutment surface in the retainer second end portion outer circumference portion in a section that passes through the second axis, and that is perpendicular to the first axis, when the retainer main body portion is inclined with respect to the second axis, wherein the retainer chamfering portion is a round chamfering, and wherein when a bisector of an angle of the retainer second end portion is drawn in a section of the retainer chamfering portion which passes through the second axis, and which is perpendicular to the first axis, a center of a radius of curvature of the round chamfering of the retainer chamfering portion is positioned on the rack bar side of the bisector of the angle of the retainer second end portion.

2. The steering device as claimed in claim 1, wherein the spring holding member includes a spring holding portion;

the spring holding portion is provided in a region including the second axis in the section perpendicular to the second axis; the spring includes a pair of end portions in the second axis; the pair of the end portions includes a spring first end portion and a spring second end portion;

the spring holding portion is configured to be abutted on the spring second end portion farther from the rack bar; and the spring holding member abutment surface is provided outside the spring holding portion in a radial direction of the second axis; the spring holding member abutment surface has a shape parallel to a plane perpendicular to the second axis, or a conical trapezoid shape inclined to be gradually closer to the rack bar from an outside to an inside in the radial direction of the second axis.

3. The steering device as claimed in claim 1, wherein the steering device includes a retainer holding member;

the retainer holding member is an O ring;

the retainer includes a retainer holding member holding groove;

the retainer holding member holding groove is formed on an outer circumference side of the retainer; and the retainer holding member holding groove has an annular groove shape extending in a circumferential direction of the second axis; and the retainer holding member holding groove is provided at a position farther from the rack bar than a middle point of the retainer in the second axis direction.

4. The steering device as claimed in claim 1, wherein the retainer has an outside diameter with respect to the second axis of the retainer; the outside diameter of the retainer is smaller than an inside diameter of the retainer receiving portion with respect to the second axis by a first length;

the spring holding member is provided within the retainer receiving portion so that the retainer second end portion and the spring holding member abutment surface are apart from each other in the second axis direction by a second length when the rack bar is in a static state; and an equation: $L1/2<L2$ is satisfied where the first length is L1, and the second length is L2.

5. The steering device as claimed in claim 1, wherein the spring holding member is formed by forging by using a die; and the spring holding member abutment surface includes a plastic machined surface formed by the die.

6. The steering device as claimed in claim 1, wherein the retainer has an outside diameter with respect to the second axis of the retainer; and the outside diameter of the retainer is smaller than an outside diameter of the spring holding member abutment surface with respect to the second axis.

7. The steering device as claimed in claim 1, wherein the spring holding member includes a spring holding member chamfering portion; and the spring holding member chamfering portion is provided on an outer circumference edge of the spring holding member abutment surface in a section perpendicular to the second axis.

8. The steering device as claimed in claim 1, wherein the retainer chamfering portion is formed on two portions of the retainer second end portion outer circumference portion crossing a section which passes through the second axis, and which is parallel to the first axis.

9. The steering device as claimed in claim 8, wherein the retainer chamfering portion is formed on an entire circumference of the retainer second end portion outer circumference portion.

* * * * *